United States Patent [19]
Moroi et al.

[11] Patent Number: 6,116,514
[45] Date of Patent: Sep. 12, 2000

[54] VEHICULAR HEAT GENERATORS AND VISCOUS FLUIDS FOR THE SAME

[75] Inventors: Takahiro Moroi; Takashi Ban; Hidefumi Mori; Tatsuya Hirose; Shigeru Suzuki, all of Kariya, Japan

[73] Assignee: Kabushiki Kaisha Toyoda Jidoshokki Seisakusho, Aichi-Ken, Japan

[21] Appl. No.: 09/011,857

[22] PCT Filed: Jun. 9, 1997

[86] PCT No.: PCT/JP97/01948

§ 371 Date: Feb. 5, 1998

§ 102(e) Date: Feb. 5, 1998

[87] PCT Pub. No.: WO97/47487

PCT Pub. Date: Dec. 18, 1997

[30] Foreign Application Priority Data

Jun. 12, 1996 [JP] Japan .................................. 8-151040

[51] Int. Cl.[7] ...................................................... B60H 1/02
[52] U.S. Cl. ............................. 237/12.3 R; 237/12.3 B; 122/26; 126/247; 123/142.5 R
[58] Field of Search ..................... 237/12.3 R, 12.3 B; 122/26; 126/247; 123/142.5 R; 252/573, 71, 78.3

[56] References Cited

U.S. PATENT DOCUMENTS

| | | | |
|---|---|---|---|
| 4,993,377 | 2/1991 | Itakura | 123/142.1 R |
| 5,549,743 | 8/1996 | Pearce | 106/122 |
| 5,573,184 | 11/1996 | Martin | 237/12.3 R |
| 5,656,577 | 8/1997 | Kato et al. | 508/210 |
| 5,788,151 | 8/1988 | Moroi et al. | 237/12.3 R |

*Primary Examiner*—Henry Bennett
*Assistant Examiner*—Derek S. Boles
*Attorney, Agent, or Firm*—Morgan & Finnegan, L.L.P.

[57] ABSTRACT

As a viscous fluid (F) contained in a vehicular heat generator provided with a rotor (33), a non-Newtonian fluid having an apparent viscosity that decreases as the shear rate of the rotor (33) increases (e.g., a kind of silicone oil) is employed. The nominal viscosity of the viscous fluid (F) is in the range of 10,000 cSt to 200,000 cSt. If such viscous fluid is employed, the viscous fluid (F) maintains its shear heat generating function over an extended period even under circumstances where the fluid (F) is subjected to over-shearing by over-rotation of the rotor (33). In addition, low-temperature starting of the rotor is facilitated.

23 Claims, 15 Drawing Sheets

VEHICULAR HEAT GENERATORS AND VISCOUS FLUIDS FOR THE SAME

BACKGROUND OF THE INVENTION

The present invention relates to a vehicular heat generator having a rotor and a viscous fluid contained in a heating chamber defined in a housing to generate heat by subjecting the viscous fluid to shearing by rotating the rotor, and to a viscous fluid for the same.

Japanese Unexamined Patent Publication No. HEI 2-246823 (corresponding to U.S. Pat. No. 4,993,377) discloses a vehicular heating system and a heat generator incorporated in the system. In the heat generator, shear force is applied by a labyrinth-shaped rotor to a viscous fluid sealed in a heating chamber defined in the heat generator to convert rotational energy of the rotor to thermal energy and generate heat as a result. The patent publication describes use of a silicone oil as an example of the viscous fluid. The Japanese Unexamined Patent Publication No. HEI 2-246823 recites: "The heat generating capacity of the heat generator can be preset as desired depending on the viscosity coefficient of the viscous fluid sealed in the heating chamber. In other words, the higher the viscosity coefficient of a viscous fluid, the greater the shear force occurring at grooves of the labyrinth and thus the higher the heat generating capacity is . . . On the other hand, the lower the viscosity coefficient of a viscous fluid is, the smaller the shear force occurring at the grooves of the labyrinth and thus the lower the heat generating capacity becomes."

The Japanese Unexamined Patent Publication No. HEI 2-246823 merely describes, referring to properties of the viscous fluid, the very basic concept that it is preferred to select a viscous fluid having a specific viscosity so as to set a desired shear heat generating capacity of the heat generator.

However, the present inventors found that a viscous fluid, employable in a vehicular heat generator designed to generate heat by shearing viscous fluid with a rotor, has a certain optimum range in its rheological properties. According to the finding of the present inventors, if a highly viscous fluid (typically a highly viscous silicone oil) is merely employed for the purpose of increasing heat generating capacity, the viscous fluid deteriorates soon due to the high heat thus generated and is thus unable to continue heat generation by mechanical shearing. Accordingly, it is not realistic to select the viscosity of a viscous fluid simply in view of improving the heat generating capacity.

Further, while vehicular heat generators are in many cases driven by power from vehicle engines, the engines involve a drawback in that they are operated in wide speed ranges, respectively, so that it is impossible to expect a constant power supply from each engine at a stable rotating speed. Accordingly, the rotating speed of the rotor is increased dramatically by the engine, when the engine speed is increased. However, the viscous fluid, having desired properties (particularly viscosity), is selected to obtain optimum and stable heat at a normal revolution speed. Therefore, over-shearing and over-heating may result. Overheating eventually deprives the viscous fluid of the desired properties, as described above.

It is an objective of the present invention to provide a viscous fluid that is employable in a vehicular heat generator based on studies and findings on the desired properties of viscous fluids for heat generators.

It is another objective of the present invention to clarify the relationship between the heating value generated by a heat generator or the time until the heating value is equilibrated and specific nominal viscosity values and to provide a vehicular heat generator employing a viscous fluid having a desired nominal viscosity.

SUMMARY OF THE INVENTION

The viscous fluid according to the present invention, which is contained in a vehicular heat generator provided with a rotor and which generates heat under mechanical shearing of the rotor, is characterized in that the viscous fluid is a non-Newtonian fluid having apparent viscosity characteristics with respect to shear rate such that the apparent viscosity tends to decrease as the shear rate increases. If such non-Newtonian fluid is employed as the viscous fluid, it can maintain its shear heat generating function over a long period, even under a circumstance where it is exposed to over-shearing due to over-rotation of the rotor. Further, low-temperature starting of the rotor is facilitated.

The viscous fluid preferably has a nominal viscosity in the range of 10,000 cSt to 200,000 cSt (centistokes), more preferably, in the range of 10,000 cSt to 100,000 cSt, most preferably, depending on the type of heat generator, in the range of 15,000 cSt to 100,000 cSt or in the range of 30,000 cSt to 100,000 cSt. Generally, if a viscous fluid having a nominal viscosity in the range of 10,000 cSt to 200,000 cSt is employed in a vehicular heat generator, the heat generator will have an acceptable heating value and loading torque in practical uses.

The viscous fluid is preferably a fluid containing a silicone oil as a major component. More preferably, the silicone oil is dimethyl-polysiloxane. The reason why use of such a specific viscous fluid is preferred in the vehicular heat generator is as described below.

In the vehicular heat generator according to the present invention, there is a close relationship between the structural characteristics of the heat generator and the properties of the viscous fluid to be employed therein.

A first type of vehicular heat generator, according to the present invention, has a housing in which a heating chamber containing a viscous fluid and a radiating chamber through which a circulating fluid flows are defined. A rotary shaft is rotatably supported in the housing. A rotor, located in the heating chamber, is rotated by the rotary shaft. Heat generated by shearing of the viscous fluid under rotation of the rotor is transferred to the circulating fluid. The first type of heat generator is characterized in that a fluid having a nominal viscosity in the range of 10,000 cSt to 200,000 cSt is employed as the viscous fluid. A viscous fluid having a nominal viscosity of less than 10,000 cSt gives a small heating value; whereas a viscous fluid having a nominal viscosity of more than 200,000 cSt results in an excessive loading torque. Accordingly, in practice, the nominal viscosity of the viscous fluid to be employed in a vehicular heat generator is within the range of 10,000 cSt to 200,000 cSt.

A second type of vehicular heat generator, according to the present invention, has a housing in which a heating chamber containing a viscous fluid, a reservoir communicating with the heating chamber and storing viscous fluid therein, and a radiating chamber through which a circulating fluid flows are defined. A rotary shaft is rotatably supported in the housing. A rotor, located in the heating chamber, is rotated by the rotary shaft. Heat generated by shearing of the viscous fluid under rotation of the rotor is transferred to the circulating fluid. The second type of heat generator is characterized in that a fluid having a nominal viscosity in the range of 10,000 cSt to 100,000 cSt is employed as the viscous fluid.

In the second type, since the viscous fluid is stored in the reservoir, the amount of viscous fluid employed in the vehicular heat generator can be increased greatly compared with heat generators having no reservoir. While the viscous fluid tends to deteriorate (or to have reduced viscosity) by undergoing shearing by the rotor, the reservoir stores surplus viscous fluid to be subjected to shearing to prevent a given portion of the viscous fluid from being constantly sheared. Thus, the greater the amount of the viscous fluid, the longer the life of the entire amount of viscous fluid employed is and the higher the reliability of the heat generator becomes. In the case where the nominal viscosity exceeds 100,000 cSt, the time required until the heating value is equilibrated is increased dramatically, although the heating value is not increased very much with the increase in the nominal viscosity. Accordingly, the nominal viscosity of the viscous fluid employed in the second type of vehicular heat generator is preferably in the range of 10,000 cSt to 100,000 cSt. Further, while the viscous fluid should be able to flow smoothly between the heating chamber and the reservoir in this vehicular heat generator, it is difficult for a viscous fluid having a high viscosity of more than 100,000 cSt to flow smoothly even during heat generation (at high temperatures), thus defeating the purpose of the reservoir. Therefore, in view of this point, the nominal viscosity of the viscous fluid is preferably 100,000 cSt or less.

It is more preferable in the first and second types of vehicular heat generators that the viscous fluids are silicone oils showing non-Newtonian viscosity such that the apparent viscosity decreases as the shear rate increases.

In the first and second types of vehicular heat generators, the viscous fluids preferably have a nominal viscosity within the range of 30,000 cSt to 100,000 cSt. The heating value tends to increase steeply as the nominal viscosity is increased until and immediately before the nominal viscosity reaches 30,000 cSt. However, at a nominal viscosity of 30,000 cSt or more, the increase in the heating value tends to reach a ceiling, even if the nominal viscosity is increased. Accordingly, when importance is attached to stability and predictability of the heating capacity, the optimum nominal viscosity of the viscous fluid to be employed in the vehicular heat generator is in the range of 30,000 cSt to 100,000 cSt.

In the first and second types of vehicular heat generators, it is further preferred that the rotors are provided with means for increasing shearing efficiency. In this case, the nominal viscosity of the viscous fluid is preferably within the range of 15,000 cSt to 100,000 cSt. If the rotors are provided with means for increasing shearing efficiency, the tendency for the increase in the heating value to reach a ceiling appears at a nominal viscosity of lower than 30,000 cSt (i.e., at 15,000 cSt).

In the second type of vehicular heat generator, it is preferred that the reservoir and the heating chamber communicate with each other via a recovery passage and a supply passage, that the reservoir-side outlet of the recovery passage is located above the level of the viscous fluid, and that the reservoir-side inlet of the supply passage is located below that level.

According to this constitution, the volume of the viscous fluid in the reservoir is smaller than the capacity of the reservoir, so that the viscous fluid in the heating chamber is recovered into the reservoir through the recovery passage. The viscous fluid in the reservoir is supplied to the heating chamber through the supply passage. While the viscous fluid is recirculated between the reservoir and the heating chamber, if the nominal viscosity of the viscous fluid exceeds 100,000 cSt, the fluid cannot be recirculated smoothly. Accordingly, the viscous fluid to be employed in the vehicular heat generator equipped with a reservoir preferably has a nominal viscosity in the range of 10,000 cSt to 100,000 cSt. Most preferably, depending on the presence or absence of the means for increasing shearing efficiency, in the range of 30,000 cSt to 100,000 cSt or in the range of 15,000 cSt to 100,000 cSt. Incidentally, the structure where the recovery passage is located above the level of the viscous fluid and where the supply passage is located below that level constitutes, with the aid of the weight of the viscous fluid, the simplest structure for circulating the viscous fluid between the heating chamber and the reservoir.

In the first and second types of vehicular heat generators, it is preferred to locate a clutch, on a drive power transmitting train, between an external drive source and the rotary shaft of the rotor. If the nominal viscosity of the viscous fluid is too high, the load to be applied to the rotor becomes excessive leading to trouble in transmitting driving force at the clutch. Although such trouble can be avoided by enlarging the clutch, enlargement of the clutch is undesirable. This problem can be avoided easily by employing a viscous fluid having a nominal viscosity of 10,000 cSt to 100,000 cSt.

The second type of vehicular heat generator preferably has, at the rotational central zone of the rotor, communicating passages for permitting communication between the heating chamber and the reservoir and a heat generating capacity adjusting function for recovering the viscous fluid from the heating chamber through the communicating passages to the reservoir, at least by the Weissenberg effect, when the heat generator is operated with reduced heat generating capacity. According to this vehicular heat generator, the capacity of the reservoir is increased when the heat generator is operated with reduced heat generating capacity, and a part of the viscous fluid in the heating chamber is recovered into the reservoir at least by the Weissenberg effect. More specifically, this heat generating capacity adjusting function results from the structure of the reservoir, which has a variable capacity. Change in the capacity of the reservoir is carried out depending on the need to increase or decrease the heat generating capacity. Variable control of the heat generating capacity is achieved by the flow of the viscous fluid between the heating chamber and the reservoir.

The second type of vehicular heat generator is preferably provided with a recovery passage and a supply passage permitting communication between the reservoir and the heating chamber and with a heat generating capacity adjusting function for recovering the fluid from the heating chamber through the recovery passage to the reservoir, at least by the Weissenberg effect, when the heat generator is operated with reduced heat generating capacity. The supply passage is closed when the heat generator is operated with reduced heat generating capacity, and a part of the viscous fluid in the heating chamber is recovered through the recovery passage into the reservoir at least by the Weissenberg effect. More specifically, this heat generating capacity adjusting function results from the means or structure for opening and closing the supply passage. Opening and closing of the supply passage is carried out depending on the need to increase or decrease the heat generating capacity. Variable control of the heat generating capacity is achieved by the flow of the viscous fluid between the heating chamber and the reservoir.

As described above, use of a viscous fluid having a certain nominal viscosity in a vehicular heat generator equipped with a heat generating capacity adjusting function is important to achieve smooth circulation of the viscous fluid between the heating chamber and the reservoir.

BRIEF DESCRIPTION OF THE DRAWINGS

FIG. 2 shows the heating system illustrated in FIG. 1, is a state where the solenoid clutch is ON;

DETAILED DESCRIPTION OF THE PREFERRED EMBODIMENTS

Figure 1:
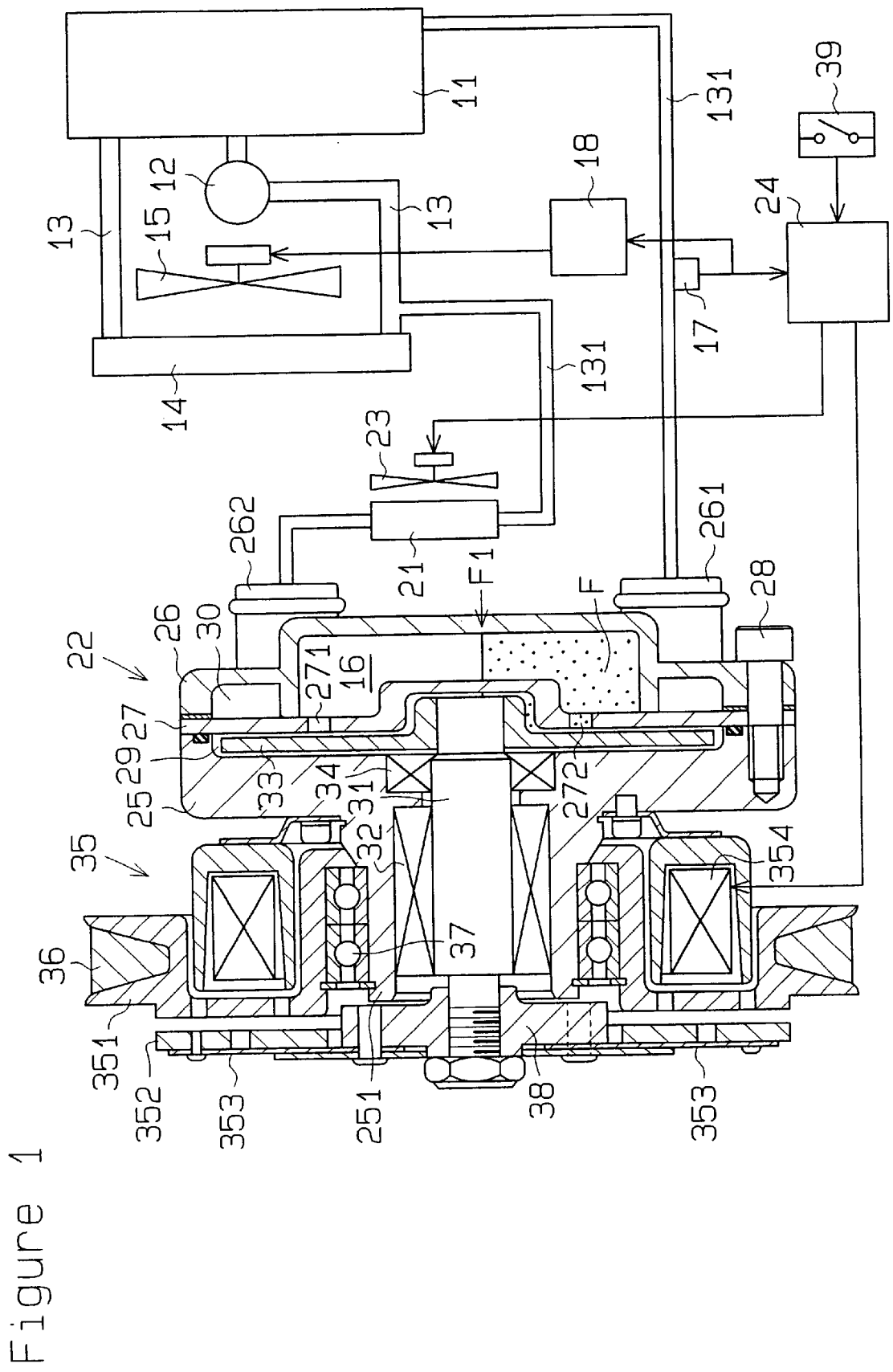
FIG. 1 shows a heating system containing a heat generator according to a first embodiment of the present invention, in a state where a solenoid clutch is OFF.

Preferred properties of a viscous fluid that is used in a vehicular heat generator provided with a rotor and that undergoes mechanical shearing by the rotor to generate heat will be detailed below.

According to theoretical analyses and experiments of the rotor type vehicular heat generator made by the present inventors, a torque T generated by fluid friction between a rotor and a viscous fluid is proportional to viscosity coefficient $\mu$ of the viscous fluid employed, and a theoretical heating value Q of the vehicular heat generator is proportional to power L or the product (T$\omega$) of the torque T and a rotor angular velocity $\omega$. In other words, the theoretical heating value Q is proportional not only to the rotor angular velocity $\omega$ but also to the viscosity coefficient $\mu$ of the viscous fluid. Incidentally, the following expressions (1) and (2) represent correlation between a frictional torque T and a theoretical heating value Q in a vehicular heat generator provided with a disc-shaped rotor as will be described later in the first to fifth embodiments. In the expression (1), "r" represents the rotor radius; and "h" represents the clearance between the rotor surface and the inner wall surface of a heating chamber surrounding the rotor.

Frictional torque:

$$T (4\pi\omega r^4/h)\times\mu \qquad (1)$$

Theoretical heating value:

$$Q\ T\times\omega \qquad (2)$$

(Preferred rheological properties of viscous fluids)

A preferred property of a viscous fluid for a vehicular heat generator is that the apparent viscosity of the fluid shows a pseudoplastic fluid-like non-Newtonian viscosity.

Generally, on the standpoint of Theological behaviors, fluids are roughly divided into Newtonian fluids and non-Newtonian fluids. Newtonian fluids are fluids that conform to Newton's viscosity law, and such fluid properties are generally called Newtonian viscosity. Meanwhile, fluids that do not conform to Newton's viscosity law are generally referred widely to as non-Newtonian fluids. When one tries to find out whether a fluid is a Newtonian fluid or a non-Newtonian fluid, there is a method based on the index number when the power-law fluid model is applied. For example, when a rotary disc (radius r; corresponding to the rotor) and a stationary plate (corresponding to the inner wall surface of the heating chamber) are located parallel to each other in a certain fluid with a predetermined clearance "h" being between them and the disc is rotated at an angular velocity $\omega$, the relationship between the viscosity coefficient $\mu$ and a shear rate V is applied to a power function of the following expression (3):

Viscosity coefficient:

$$\mu=\mu_0\ V^{(n-1)}$$

$$=\mu_0(1/V)^{(1-n)} \qquad (3)$$

($\mu_0$ is a constant of proportion)

Shear rate:

$$V=r\omega/h \qquad (4)$$

In the expression (3), if the equation is effective when n=1, or if $\mu$ is equal to the constant of proportion, the fluid is a Newtonian fluid. On the other hand, when the equation is effective when n≠1 (0<n<1, 1<n), the fluid is a non-Newtonian fluid. As described above, in the case of the Newtonian fluid (n=1), $\mu$ becomes constant, and the viscosity coefficient $\mu$ is constant independent of the shear rate V.

Meanwhile, in the case of the non-Newtonian fluid, the viscosity coefficient $\mu$ is proportional to the power of V or 1/V and is also dependent on the shear rate V. Incidentally, Newtonian fluids include, for example, water, organic solvents, low-molecular weight oils and low-molecular weight organic compounds.

Non-Newtonian fluids can be classified further into two groups. More specifically, depending on whether the value n is greater or smaller than 1 in the expression (3), rheological behaviors of non-Newtonian fluids differ. When n is greater than 1(1<n), the viscosity coefficient $\mu$ is proportional to the power of shear rate V. This means that the viscosity coefficient $\mu$ increases as the shear rate V increases, and this is a dilatant fluid-like property. Meanwhile, when n is smaller than 1 (0<n<1), the expression (3) is converted to $=\mu_0 \cdot (1/V)^{(1-n)}$ (i.e., the index is constantly positive), and the viscosity coefficient $\mu$ is proportional to the power of the inverse number of the shear rate (1/V). This means that the viscosity coefficient $\mu$ decreases as the shear rate V increases, which is a pseudoplastic fluid-like property (or shear thinning property).

Accordingly, if a dilatant fluid is employed as a viscous fluid in a vehicular heat generator, the theoretical heating value Q thereof increases dramatically as the rotor angular velocity $\omega$ increases due to the effect of the increase of the rotor angular velocity $\omega$ (see expressions (1) and (2)) and the effect of the increase in the viscosity coefficient $\mu$ as the rotor angular velocity $\omega$ increases (increase in the shear rate V). On the other hand, when a pseudoplastic fluid-like fluid is employed in a vehicular heat generator, the viscosity coefficient $\mu$ of the fluid tends to decrease as the rotor angular velocity $\omega$ increases (increase in the shear rate V), although the increase of rotor angular velocity $\omega$ can be a factor promoting an increase in the theoretical heating value Q. Accordingly, when a pseudoplastic fluid-like fluid is employed, there occurs a repressive factor such that the viscosity coefficient $\mu$ decreases even if the rotor angular velocity $\omega$ is increased, so that there is a small tendency that the theoretical heating value Q increases, and such increase is rather inhibited.

A pseudoplastic fluid-like non-Newtonian fluid is desirable as the viscous fluid to be employed, particularly in a vehicular heat generator. It is realistic when such viscous fluid is employed to select the viscosity of the viscous fluid such that a necessary heating value is attained in the normal revolution speed range of a vehicle engine (e.g., 600 to 2,000 rpm in the case of a diesel engine). For example, even if the revolution speed of the engine is increased beyond the normal revolution speed range to accelerate the vehicle, or if the rotor angular velocity $\omega$ in the vehicular heat generator is increased excessively (and so is the shear rate V), the viscosity coefficient $\mu$ of the viscous fluid tends to decrease as described above. Accordingly, since the viscosity coefficient $\mu$ decreases in spite of the increase in the rotor angular velocity $\omega$, an increase in the theoretical heating value Q is suppressed to a certain extent. Accordingly, even when the revolution speed of the vehicular engine is increased, overheating of the viscous fluid due to over-shearing thereof is avoided by self-regulation. Therefore, deterioration of the viscous fluid is avoided, which extends the use of the vehicular heat generator.

Meanwhile, if a Newtonian fluid or a dilatant non-Newtonian fluid is employed as the viscous fluid, it is apparent that the theoretical heating value Q shows a notable tendency to increase with the increase in the rotor angular velocity $\omega$ to leading to overheating by over-shearing of the viscous fluid and early deterioration of the viscous fluid.

Figure 10:
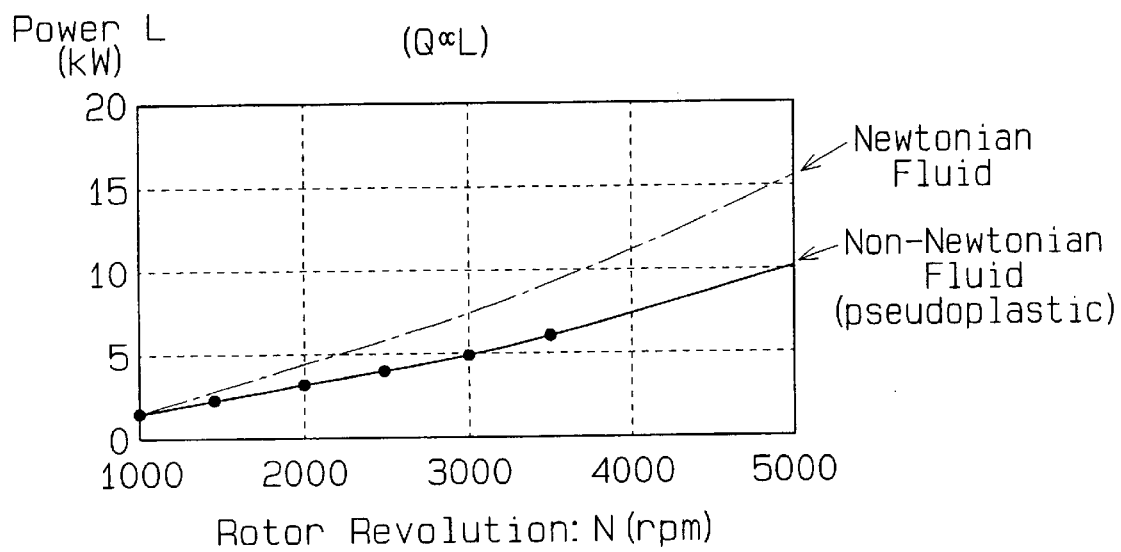
FIG. 10 is a graph showing results of simulation of the relationship between the revolution speed of the rotor and the power in the vehicular heat generator.

Incidentally, FIG. 10 shows the results of computer-simulated relationship between the revolution speed N of the rotor in the vehicular heat generator and the power L=T$\omega$ (the power L is proportional to the theoretical heating value Q), in a comparison between a case where a Newtonian fluid is employed as the viscous fluid and a case where a pseudoplastic fluid-like non-Newtonian fluid is employed as the viscous fluid. The closed circles plotted in FIG. 10 show resulting values when a silicone oil to be described later was employed as the non-Newtonian fluid. As shown in FIG. 10, use of the pseudoplastic fluid-like non-Newtonian fluid reduces in the extent of fluctuation of the theoretical heating value Q with respect to the change in the revolution speed N of the rotor.

As described above, the viscous fluid to be employed in the vehicular heat generator is preferably a pseudoplastic fluid-like non-Newtonian fluid. However, if such viscous fluid is prescribed quantitatively, a fluid represented by the expression (3) wherein n is in the range of 0.3 to 0.5 is more preferred.

(Preferred nominal viscosity of viscous fluid)

Viscous fluids for vehicular heat generators have preferably nominal viscosity values in the range of 10,000 cSt to 200,000 cSt, more preferably in the range of 10,000 cSt to 100,000 cSt, still more preferably in the range of 15,000 cSt (or 30,000 cSt) to 100,000 cSt.

Figure 9:
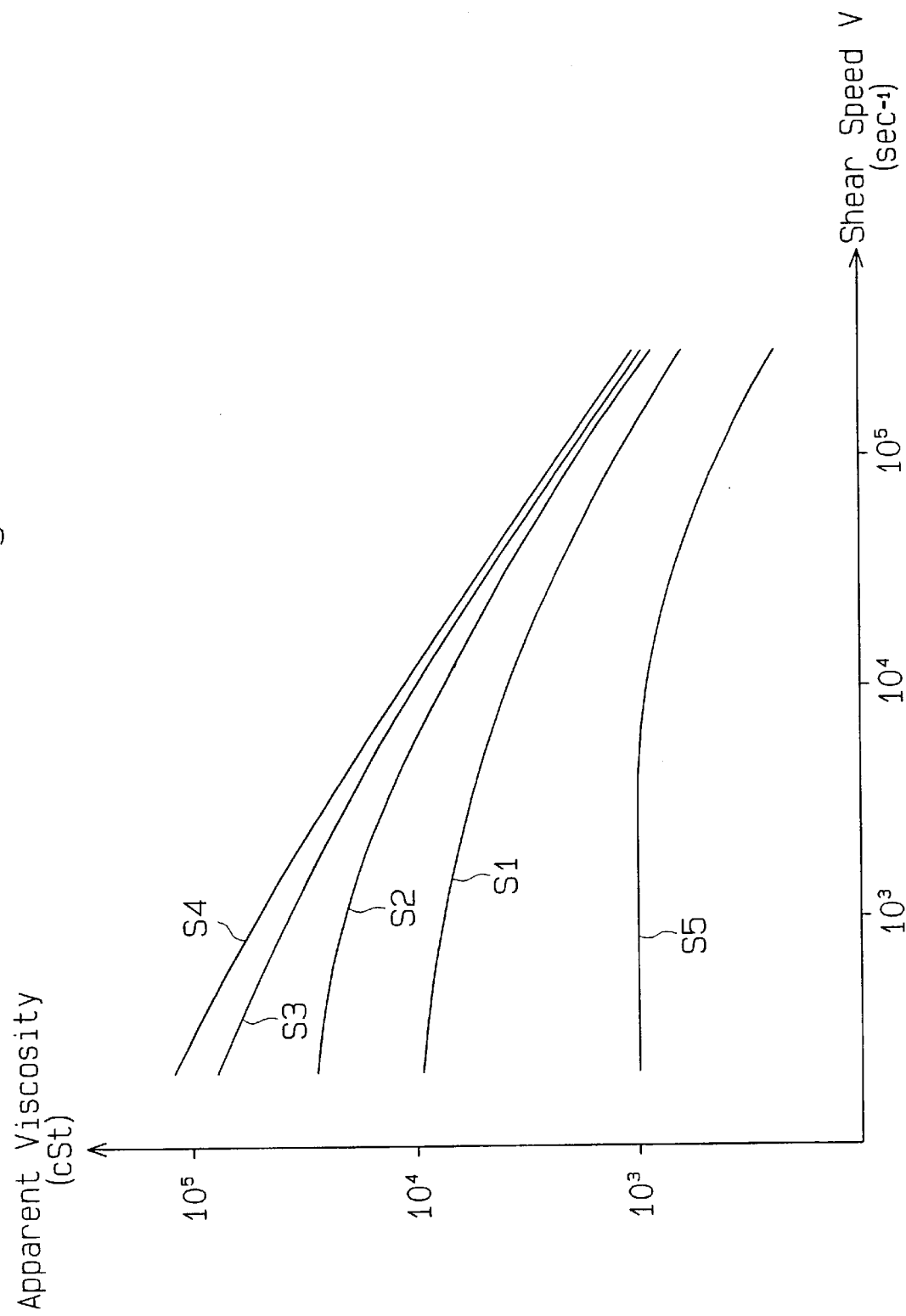
FIG. 9 is a graph explaining the concept of nominal viscosity and also showing the relationship between the apparent viscosity of silicone oil which is suitable as the viscous fluid to be employed in a heat generator and the shear rate.

According to the finding of the present inventors with respect to the relationship between the viscosity of the viscous fluid and the heating value of the heat generator, the heating value to be obtained, or the time until the heating value is equilibrated, and the like change depending on the nominal viscosity. In the case of a non-Newtonian fluid, while the apparent viscosity of the viscous fluid depends on the shear rate V (i.e., rotational speed of the rotor), the viscosity when the shear rate is zero, assumed based on the apparent viscosity at normal temperature (25° C. to 30° C.), is referred to as "nominal viscosity". FIG. 9 shows relationship between the shear rate V and the apparent viscosity in a high-molecular weight silicone oil employed as a pseudoplastic fluid-like non-Newtonian fluid. The curve S1 in FIG. 9 represents a viscous fluid having a nominal viscosity of 10,000 cSt; the curve S2 represents a viscous fluid having a nominal viscosity of 30,000 cSt; the curve S3 represents a viscous fluid having a nominal viscosity of 100,000 cSt; and the curve S4 represents a viscous fluid having a nominal viscosity of 200,000 cSt.

In a vehicular heat generator, a viscous fluid having a nominal viscosity of less than 10,000 cSt gives a small heating value; whereas a viscous fluid having a nominal viscosity of more than 200,000 cSt results in an excessive loading torque. Accordingly, the viscous fluid is required to have a nominal viscosity within the range of 10,000 cSt to 200,000 cSt. However, in the case of a viscous fluid having a nominal viscosity of more than 100,000 cSt, the time required until the heating value is equilibrated is significantly increased, which is undesirable, although the heating value is not increased as much as the viscosity is increased. Further, a highly viscous fluid having a viscosity of more than 100,000 cSt does not flow smoothly even during heat generation (at high temperatures), which may restrict the flow within the heater housing. Due to such problems, the upper limit of nominal viscosity is preferably 100,000 cSt rather than 200,000 cSt.

(Typical examples of viscous fluid satisfying the above requirements)

Fluids capable of showing pseudoplastic fluid-like non-Newtonian viscosity include polymers such as silicone oils, polyacrylamides and high-molecular weight polyethylene oxides. However, whether a polymer as the viscous fluid shows a pseudoplastic fluid-like non-Newtonian viscosity does not depend on factors of unit molecules constituting the polymer (primary structure of the polymer) but rather is influenced greatly by the molecular weight or secondary structure of the polymer. The dilatancy and pseudoplasticity referred to above are supposed to be attributed mainly to formation and disruption of the secondary structure in the fluid molecules. Accordingly, as far as silicone oils are concerned, not all silicones falling under the category of silicone oils show pseudoplastic fluid-like non-Newtonian viscosity, but there are some silicone oils that fall under the category of Newtonian fluid or dilatant fluid.

Figure 11:
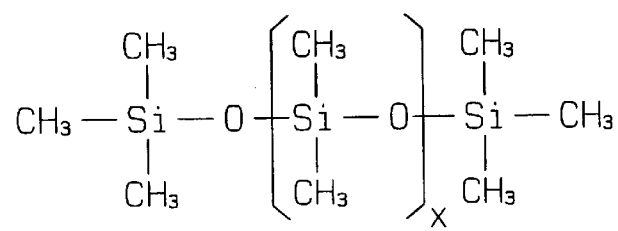
FIG. 11 is the chemical structural formula of dimethylpolysiloxane.

Silicone oils capable of showing pseudoplastic fluid-like non-Newtonian viscosity typically include, for example, dimethyl-polysiloxane, methylphenyl-polysiloxane and diphenyl-polysiloxane. FIG. 11 shows the chemical structural formula of linear dimethyl-polysiloxane.

Further, phenyl-substituted polysiloxane, in which methyl groups ($CH_3$—) in dimethyl-polysiloxane are partly replaced with phenyl groups ($C_6H_5$—), regularly or at random, can be also employed. According to phenyl-substituted polysiloxanes including methylphenyl-polysiloxane and diphenyl-polysiloxane, the pour point of such polysiloxane polymer can be adjusted depending on the ratio of phenyl groups to methyl groups, and thus the low temperature properties of silicone oils can be improved (see "Silicone Handbook", Chapter 5, published by The Nikkan Kogyo Shinbun, Ltd.). The incorporation of phenyl groups can also advantageously improve the thermal-oxidative stability of silicone oils (ibid.).

Dimethyl-polysiloxane, among the other silicone oils exemplified above, is most suitable as a viscous fluid for vehicular heat generators, because dimethyl-polysiloxane has high shear resistance, excellent defoaming property, excellent chemical stability (it corrodes no metals) and small temperature-dependent viscosity change (small temperature dependency of viscosity), and these overall properties are preferred for a heating medium that is sheared by a rotor.

When dimethyl-polysiloxane is employed as a silicone oil, the molecular weight thereof is preferably in the range of 60,000 to 120,000, and more preferably in the range of 60,000 to 100,000. A relationship approximate to the following expression (5) is established between the molecular weight M and the viscosity [η] of dimethyl-polysiloxane:

$$\log[\eta]=1.00+0.0123 \times M^{0.5} \qquad (5)$$

To show the typical relationship between the molecular weight and the viscosity of dimethyl-polysiloxane, the viscosity of a polymer having a molecular weight of about 60,000 is about 10,000 cSt at normal temperature; about 100,000 cSt at normal temperature in the case of a polymer having a molecular weight of about 100,000, and about 200,000 cSt at normal temperature in the case of a polymer having a molecular weight of about 120,000. It should be noted here that while dimethyl-polysiloxanes having viscosity values of 1,000 cSt or more (about 20,000 to 30,000 or more in terms of molecular weight) at normal temperature tend to show pseudoplastic fluid-like non-Newtonian viscosity, the degree of non-Newtonian viscosity of dimethyl-polysiloxane having a viscosity of about 1,000 cSt is extremely small compared with that having a viscosity value of about 10,000 cSt, so a reduction of the viscosity coefficient with an increase in the shear rate cannot always be achieved sufficiently. The curve S5 in FIG. 9 represents a viscous fluid having a nominal viscosity of 1,000 cSt.

Silicone oils including dimethyl-polysiloxane are extremely inactive chemically (chemically stable) and does not corrode metals such as copper, iron, nickel, aluminum, tin, silver, zinc, duralumin and stainless steel. Further, high-molecular weight silicone oils do not cause swelling of rubbers employed as sealing materials in a heat generator. As described above, since silicone oils show no corrosiveness against other materials, they are suitable for vehicular heat generators.

Dimethyl-polysiloxane is most preferred in that it undergoes a small viscosity change as the temperature changes (small temperature dependency of viscosity). This is because the smaller the temperature dependency of the viscosity is, the easier it is to predict the heating value during operation, and the easier it is to predict the heating value. Dimethyl-polysiloxane has a low temperature dependency of viscosity, which is of course small compared with those of general oils such as spindle oils and buffer oils, and undergoes viscosity changes at a low rate compared with the phenyl-substituted polysiloxanes as described above. Conversely speaking, it is problematic to employ such phenyl-substituted polysiloxanes as viscous fluids for heat generators because their viscosity values are highly dependent on the temperature.

Dimethyl-polysiloxane, due to its strong siloxane bond, has relatively good thermal oxidative stability and is hardly oxidized in air at 175° C. or lower. However, it undergoes stepwise oxidation in air at higher than 200° C. (referred to as high-temperature oxidation) due to pyrolysis of the methyl groups to cause gelation and heat weight loss (to undergo partial pyrolysis and form low-molecular weight components as by-products). Particularly, it is necessary to design a vehicular heat generator such that the viscous fluid reaches a high temperature of 150° C. to 170° C. for the purpose of increasing the rate of heat exchange from the viscous fluid in the heating chamber to a circulating fluid (e.g., engine coolant) flowing through a radiating chamber. In such cases, the temperature of the viscous fluid may temporarily exceed its heat resistance.

Accordingly, when a silicone oil such as dimethyl-polysiloxane is employed as a viscous fluid, a thermal oxidative stabilizer may be added as necessary. The thermal oxidative stabilizer may include aromatic amine compounds and organic acid salts of metals such as iron, cerium, nickel, titanium, zirconium and hafnium (e.g., iron octoate). Addition of such thermal oxidative stabilizer to dimethyl-polysiloxane can provide the same level of thermal oxidative stability as that of methylphenyl-polysiloxane (serviceable for several hundreds of hours at 300° C. to 350° C.).

In addition to the thermal oxidative stabilizer described above, a small amount of anti-thickening agent or anti-gelling agent may be added to the viscous fluids for heat generators.

Further, in order to impart a predetermined lubricity to the viscous fluid, a small amount of lubricative additive may be added. For example, in order to improve the lubricity of dimethyl-polysiloxane type silicone oil, an ester oil may be added as a lubricative additive. Therefore, the sliding friction at the bearing section supporting the rotor in the vehicular heat generator can be reduced, and thus the viscous fluid can serve as a lubricant for the rotor bearing section.

The viscous fluid to be employed in a heat generator need not be of a single kind of polymer but may be a blend of two or more polymers. For example, in order to obtain a silicone oil having a desired nominal viscosity of 30,000 to 100,000 cSt (e.g., 50,000 cSt), a 30,000 cSt silicone oil and a 100,000 cSt silicone oil may be blended at a predetermined ratio. Otherwise, in order to improve thermal oxidative stability without employing a thermal oxidative stabilizer, a dimethyl-polysiloxane type silicone oil may be blended with a methylphenyl-polysiloxane type silicone oil. As described above, it is effective to employ a blend of some kinds of polymers having different properties so as to impart the necessary properties to the viscous fluid.

It is generally preferred that viscous fluids for heat generators do not have viscosity characteristics dependent on the shear force acting time. For example, a thixotropic fluid has time-dependent viscosity characteristics, and when it is subjected to shearing at a certain shear rate under isothermal conditions, its viscosity (or shear stress) tends to decrease with time. If such thixotropic fluid is employed as the viscous fluid for a heat generator, a necessary heating value can be achieved for a certain time immediately after starting of the rotor but is gradually lost as the viscosity is lowered with time. Accordingly, it is not suitable to employ a thixotropic fluid as a viscous fluid for a vehicular heat generator that is required to have stable heat generating capacity during continuous operation.

In the following, five types of vehicular heat generators and embodiments of vehicular heating systems incorporated with such heat generators will be described with relation to characteristics of viscous fluids that are suitable for each.

(First embodiment)

A first embodiment of the present invention will be described below referring to FIGS. 1, 2, 3A, 3B and 3C.

Figure 2:
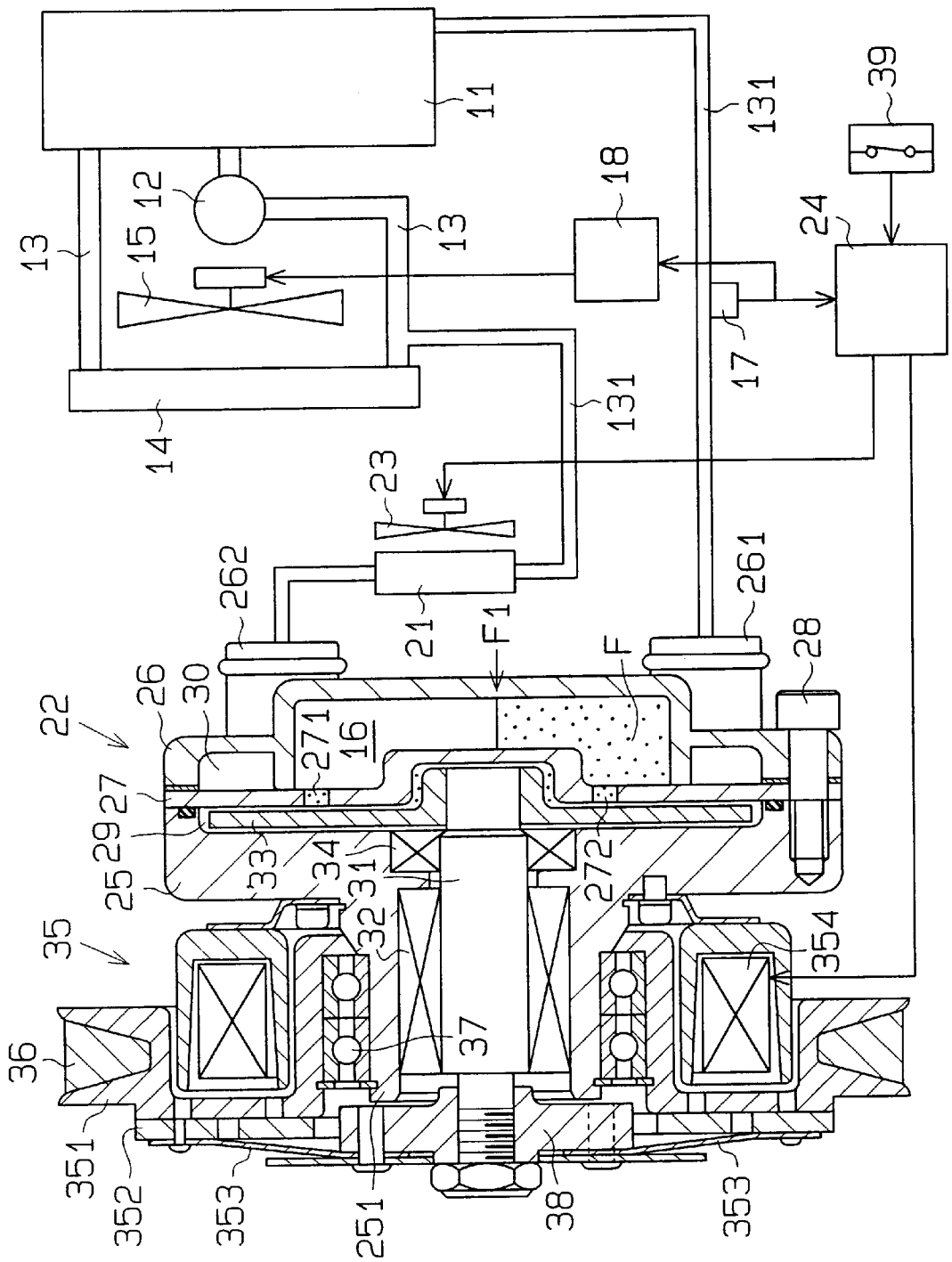

As shown in FIGS. 1 and 2, a vehicular engine 11 is cooled by a coolant, serving as a circulating fluid, circulated through a conduit 13 by a water pump 12. The coolant circulating through the conduit 13 is cooled by a radiator 14, which receives forced air from a cooling fan 15. The cooling fan 15 is an electric fan. A by-path 131 is provided between the conduit 13 and the vehicular engine 11, and a water temperature sensor 17 is attached to the by-path 131. The water temperature sensor 17 detects the temperature of the coolant flowing through the by-path 131. The cooling fan 15 is actuated under control of a cooling control section 18, which controls operation of the cooling fan 15 based on detected temperature information obtained from the water temperature sensor 17. In the case where the water temperature detected by the water temperature sensor 17 is lower than a preset water temperature, the cooling control section 18 does not actuate the cooling fan 15, and it actuates the cooling fan 15 when the detected water temperature reaches the preset water temperature.

Another radiator 21 and a vehicular heat generator 22 are located on the by-path 131. The coolant flowing through the by-path 131 is cooled at the radiator 21 by forced air from a fan 23. The fan 23 is an electric fan, and the air blown by the fan 23 is fed into a vehicle cabin.

The structure of the vehicular heat generator 22 will be described. A partition 27 having a high thermal conductivity is located between a front housing 25 and a rear housing 26, and the front housing 25 and the rear housing 26 are combined and fastened by bolts 28 to the partition 27. The space defined between the partition 27 and the front housing 25 constitutes a heating chamber 29, whereas the space defined between the peripheral zone of the partition 27 and the rear housing 26 constitutes a water jacket 30 serving as a radiating chamber. The water jacket 30 is connected to the by-path 131 via a water inlet port 261 and a water outlet port 262, and the coolant discharged from the vehicular engine 11 to the by-path 131 flows into the water jacket 30 through the inlet port 261 and is discharged through the outlet port 262.

The coolant discharged from the water jacket 30 flows toward the radiator 21.

The space defined between the central zone of the partition 27 and the rear housing 26 forms a reservoir 16. The reservoir 16 contains a viscous fluid F. A silicone oil having a nominal viscosity of 30,000 cSt to 100,000 cSt (using dimethyl-polysiloxane) is employed as the viscous fluid F. The silicone oil shows characteristics as shown by the curves S2 or S3 in FIG. 9, that is, pseudoplastic fluid-like non-Newtonian viscosity characteristics.

A rotary shaft 31 is rotatably supported in the front housing 25 via a radial bearing 32, and a disc-shaped rotor 33 is fixed to the inner end of the rotary shaft 31. The rotor 33 is housed in the heating chamber 29.

A recovery passage 271 and a supply passage 272 are defined in the partition 27. The recovery passage 271 and the supply passage 272 permit communication between the heating chamber 29 and the reservoir 16. The reservoir side port of the recovery passage 271 is located above the level F1 of the viscous fluid F in the reservoir 16, while the reservoir side port of the supply passage 272 is located below the level F1. Further, the recovery passage 271 is located at a position remote from the rotational axis of the rotor 33 so that it is opposed to a peripheral zone of the rotor 33.

A sealing mechanism 34, which is located between the front housing 25 and the rotary shaft 31, prevents the viscous fluid F from leaking along the circumference of the rotary shaft 31. A solenoid clutch 35 is provided between the outer end of the rotary shaft 31 and a cylindrical supporting portion 251 protruding forward from the front housing 25. A pulley 351 serving as one of clutch plates of the solenoid clutch 35 is operatively connected to the engine 11 via a belt 36. The pulley 351 is rotatably supported by the cylindrical supporting portion 251 via an angular bearing 37. A support ring 38 is fixed to the outer end of the rotary shaft 31. Another clutch plate 352 of the solenoid clutch 35 is supported by the support ring 38 via a leaf spring 353.

When a solenoid 354 of the solenoid clutch 35 is energized, the clutch plate 352 is brought into contact with a side face of the pulley 351 against the spring force of the leaf spring 353, as shown in FIG. 2. The contact of the clutch plate 352 with the pulley 351 causes the driving force of the vehicular engine 11 to be transmitted to the rotary shaft 31, causing the rotor 33 to rotate. The viscous fluid F in the heating chamber 29 is sheared by the rotation of the rotor 33 to generate heat. The heat thus generated is transmitted through the partition 27 to the coolant in the water jacket 30, and the water flowing through the inlet port 261 into the water jacket 30 is thus heated and discharged through the outlet port 262.

As the rotor 33 is rotated, the viscous fluid F in the heating chamber 29 is partly discharged through the recovery passage 271 to the reservoir 16, while the viscous fluid F stored in the reservoir 16 is supplied through the supply passage 272 to the heating chamber 29. This supply capability results from the fluid pressure of the viscous fluid F corresponding to the difference between the height of the supply passage 272 and the level F1 of the viscous fluid F.

When the solenoid 354 of the solenoid clutch 35 is de-energized, the clutch plate 352 is spaced away from the lateral face of the pulley 351 by the spring force of the leaf spring 353, as shown in FIG. 1. The solenoid clutch 35 is subject to energization control by an auxiliary heating control section 24. The auxiliary heating control section 24 can only energize the clutch 35 when an auxiliary heater switch 39 is turned ON. The auxiliary heating control section 24 controls magnetization and demagnetization of the solenoid clutch 35 based on the temperature information from the water temperature sensor 17.

Figure 3A:
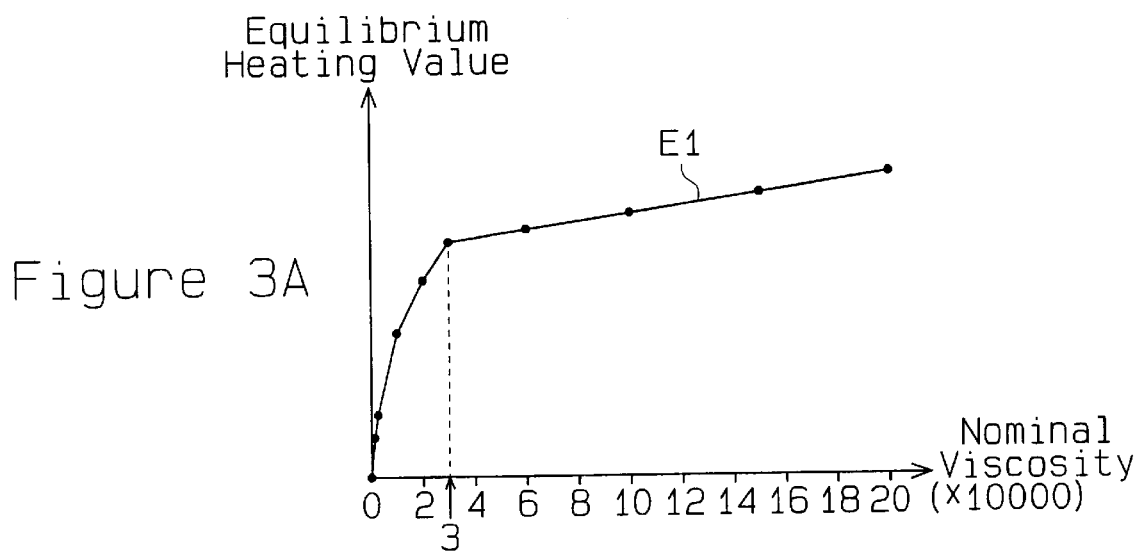
FIG. 3A is a graph of experimental data showing the relationship between the nominal viscosity and the heating value.
Figure 3B:
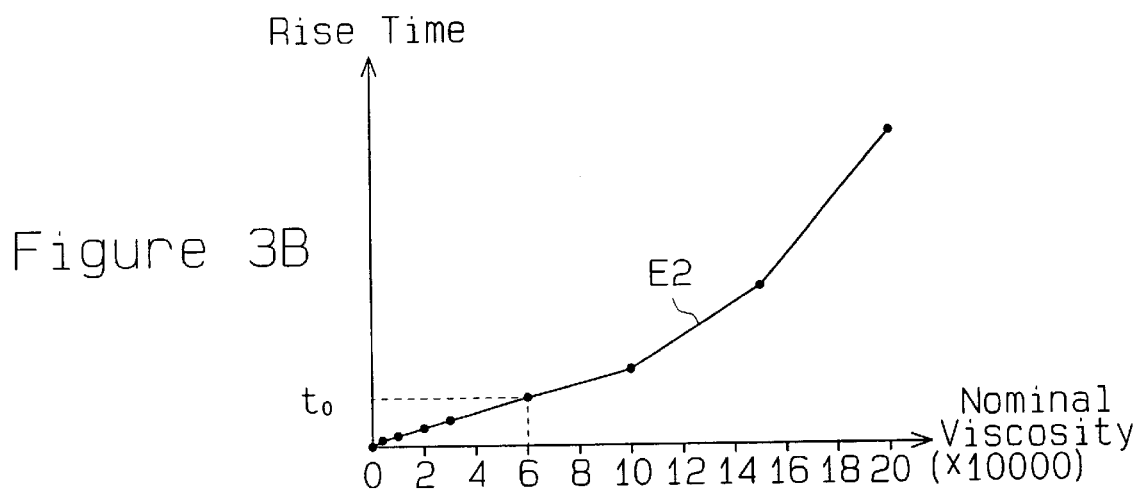
FIG. 3B is a graph of experimental data showing the relationship between the rise time required until the heating value is equilibrated and the nominal viscosity.
Figure 3C:
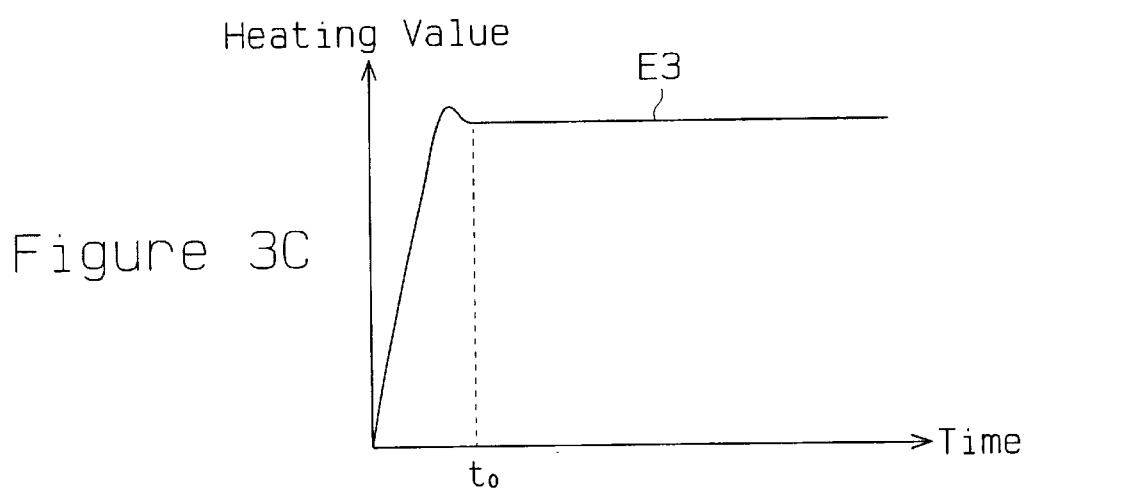
FIG. 3C is a graph of experimental data showing the rise time in a viscous fluid having a nominal viscosity of 60,000 cst.

The curve E1 in FIG. 3A shows experimental data explaining the relationship between the nominal viscosity and the heating value. The abscissa represents nominal viscosity values of viscous fluids, and the ordinate represents the equilibrium heating values finally attained. The curve E2 in FIG. 3B shows experimental data explaining the relationship between the rise time required until the heating value is equilibrated and the nominal viscosity. The abscissa represents the nominal viscosity and the ordinate represents the rise time. The curve E3 in FIG. 3C shows experimental data explaining rise time $t_0$ of a viscous fluid F having a nominal viscosity of 60,000 cSt. The abscissa represents the time elapsed, and the ordinate represents the heating value. The black points on the curves E1 and E2 are experimental results. Each experiment was carried out using the vehicular heat generator 22 at normal temperature and at a rotor revolution speed of 2,000 rpm.

Advantages of the first embodiment will be described in the following paragraphs.

(1-1) As shown by the curve E1, the fluids having nominal viscosity values of less than 10,000 cSt correspond to small heating values. Meanwhile, in the viscous fluids F having nominal viscosity values of 30,000 cSt or more, the increase in the equilibrium heating value attained as the nominal viscosity increases tends to reach a ceiling. As the curves E1 and E2 show, in the fluids having nominal viscosity values of more than 100,000 cSt, although the equilibrium heating value attained as the nominal viscosity increases is not increased very much, the time required until the heating value is equilibrated increases sharply. Accordingly, optimum range of nominal viscosity for a viscous fluid to be employed in the heat generator according to the first embodiment is 30,000 cSt to 100,000 cSt. A sufficient equilibrium heating value can be obtained in the heat generator 22 employing a viscous fluid F having a nominal viscosity within this range, and the time until appropriate heating action is obtained after the heat generator 22 is started is reduced.

(1-2) There is a tendency for the viscosity of a viscous fluid F to be reduced due to deterioration of the fluid caused by the rotational shear force of the rotor 33. The smaller the amount of the viscous fluid F employed, the higher the speed of deterioration of the fluid F. The viscous fluid F stored in the reservoir 16 increases the amount of viscous fluid F to be employed in the heat generator 22 compared with heat generators having no reservoir 16. Accordingly, the life of the viscous fluid F employed in the heat generator 22 is increased, and thus reliability of the heat generator 22 is improved.

(1-3) The speed at which the viscous fluid F undergoes deterioration is accelerated when the viscous fluid F, which is confined in a small heating chamber 29, is used continuously. The volume of the viscous fluid in the reservoir 16 is smaller than the capacity of the reservoir 16, so that the viscous fluid F in the heating chamber 29 is recovered into the reservoir 16 through the recovery passage 271 located above the level F1. The viscous fluid F in the reservoir 16 is supplied to the heating chamber 29 through the supply passage 272 located below the level F1. The viscous fluid F is recirculated between the reservoir 16 and the heating chamber 29, but a viscous fluid F having a nominal viscosity of more than 100,000 cSt cannot be recirculated smoothly. If such recirculation is not carried out smoothly, the deterioration of the viscous fluid is accelerated. Accordingly, the optimum range of nominal viscosity for the viscous fluid F to be employed in the heat generator 22 in which the viscous fluid F is circulated between the reservoir 16 and the heating chamber 29 is 30,000 cSt and 100,000 cSt.

(1-4) In the construction where the recovery passage 271 is located above the level F1 and the supply passage 272 is located below the level F1, if the viscous fluid F in the heating chamber 29 is discharged into the reservoir 16, the viscous fluid F in the reservoir 16 is continuously supplied to the heating chamber 29 due to the fluid pressure corresponding to the difference between the level F1 and the height of the supply passage 272. This circulatory structure, resulting in continuous supply, constitutes the simplest structure for circulating the viscous fluid F between the heating chamber 29 and the reservoir 16.

(1-5) If the nominal viscosity of the oil is extremely high, an excessive load is applied to the rotor 33, and slippage can occur between the pulley 351 and the clutch plate 352. That is, a problem occurs in transmitting the driving force at the solenoid clutch 35. If a viscous fluid having a nominal viscosity of 100,000 cSt or less is employed, this problem can be avoided easily.

(1-6) Generally, the rotor 33 exerts higher shear force at its peripheral zone compared to its central zone. According to the construction where the recovery passage 271 is located at a position corresponding to the peripheral zone of the rotor 33, the time during which a great shear force is applied to the viscous fluid F is reduced, and deterioration of the viscous fluid F is inhibited.

While a viscous fluid F having a nominal viscosity of 30,000 cSt to 100,000 cSt is employed in the first embodiment, in practice, there is no problem in the equilibrium heating value attained by a viscous fluid having a nominal viscosity of 10,000 cSt or more. Accordingly, the nominal viscosity of the viscous fluid F that may be employed in the vehicular heat generator 22 is in the range of 10,000 cSt to 100,000 cSt.

(Second embodiment)

Figure 4:
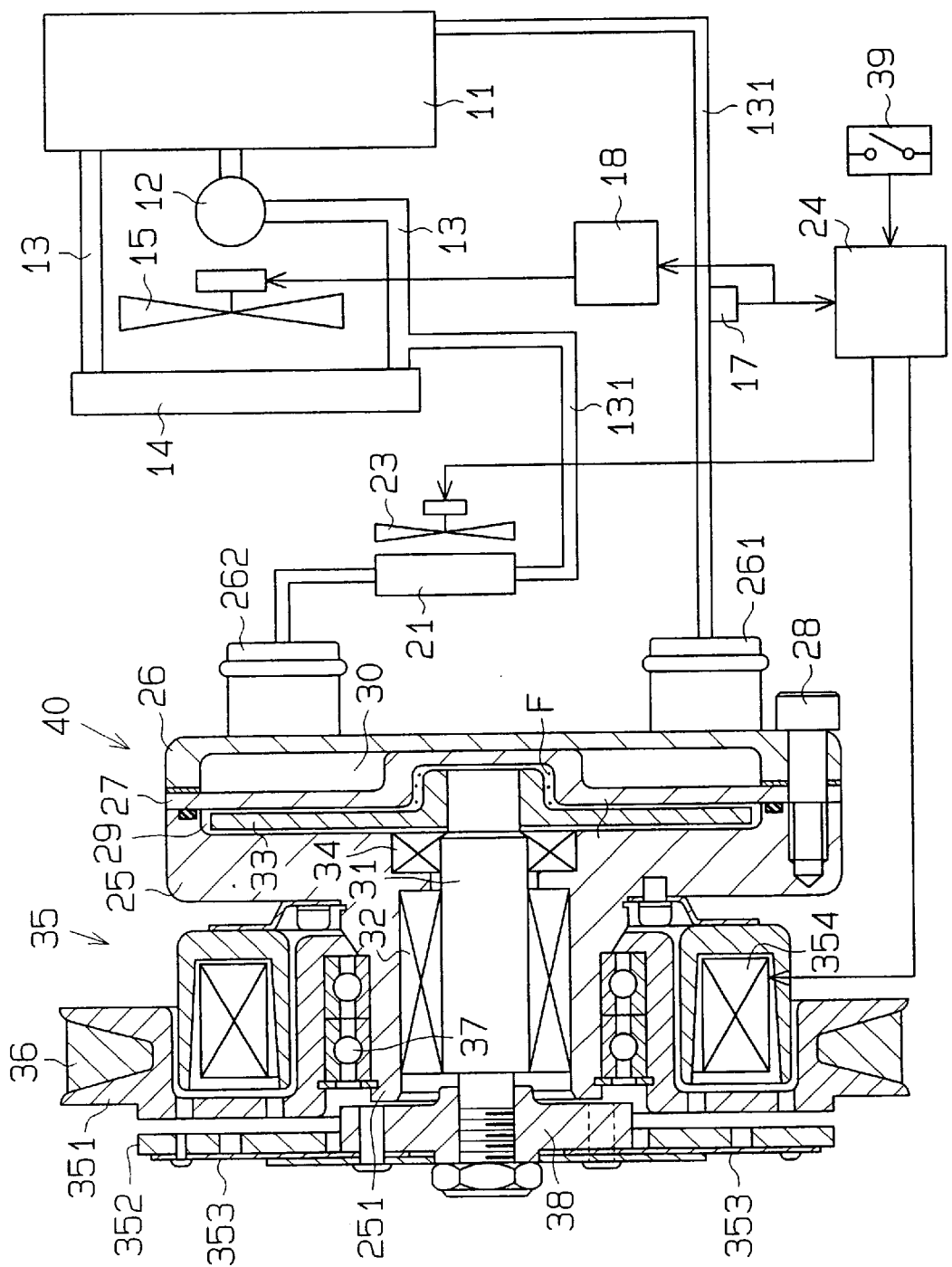
FIG. 4 is a diagram showing a heating system containing a heat generator according to a second embodiment of the present invention.

A second embodiment of the vehicular heating system incorporated with a heat generator 40 will be described referring to FIG. 4. Constituents that are the same as those in the first embodiment are affixed with the same reference numbers, respectively.

The heat generator 40 of the second embodiment is different from that of the first embodiment in that it has no reservoir 16 and that it employs a viscous fluid having a nominal viscosity of 10,000 cSt to 200,000 cSt.

A viscous fluid having a nominal viscosity of more than 200,000 cSt is extremely viscous resulting in an excessive loading torque and possible trouble in transmitting driving force in the solenoid clutch 35. Use of a viscous fluid having a nominal viscosity of 200,000 cSt or less can avoid such trouble. Accordingly, in practice, the nominal viscosity of the viscous fluid F that may be employed in the vehicular heat generator 40 is in the range of 10,000 cSt to 200,000 cSt. Incidentally, the viscous fluid F employed in the second embodiment is a silicone oil showing pseudoplastic fluid-like non-Newtonian viscosity, like in the first embodiment.

(Third embodiment)

A third embodiment of the vehicular heating system incorporated with a heat generator 41 will be described referring to FIGS. 5 and 6. Constituents that are the same as those in the first embodiment are affixed with the same reference numbers, respectively.

A rotary shaft 31 in the heat generator 41 of the third embodiment is operatively connected to a vehicular engine 11 with no clutch located therebetween. A reservoir 42 is defined between a rear housing 26 and the diametrically central zone of a partition 27. The reservoir 42 contains a viscous fluid F. A fluid having a nominal viscosity of 30,000 cSt to 100,000 cSt is employed as the viscous fluid F. The volume of the viscous fluid F contained in the heating chamber 29 and the reservoir 42 is designed to be smaller than the minimum capacity of the heating chamber 29 and the reservoir 42. The partition 27 contains a recovery passage 273 and a supply passage 274. The recovery passage 273 and the supply passage 274 provide communication between the heating chamber 29 and the reservoir 42. The distance from the rotation center of the rotary shaft 31 to the recovery passage 273 is shorter than the distance from the rotation center of the rotary shaft 31 to the supply passage 274.

A cylinder 19 is attached to the rear housing 26, and a spool 20 is slidably supported by the cylinder 19. The spool 20 is prevented from rotating around the cylinder 19 by a pin 53 protruding from the inner end face of the rear housing 26. A compression spring 43 is located between the cylinder 19 and the spool 20. The compression spring 43 urges the spool 20 toward the partition 27. A suction pump 44 is connected to the cylinder 19 via a solenoid valve 45. The suction pump 44 is operated by the driving force of the vehicle engine 11.

Figure 5:
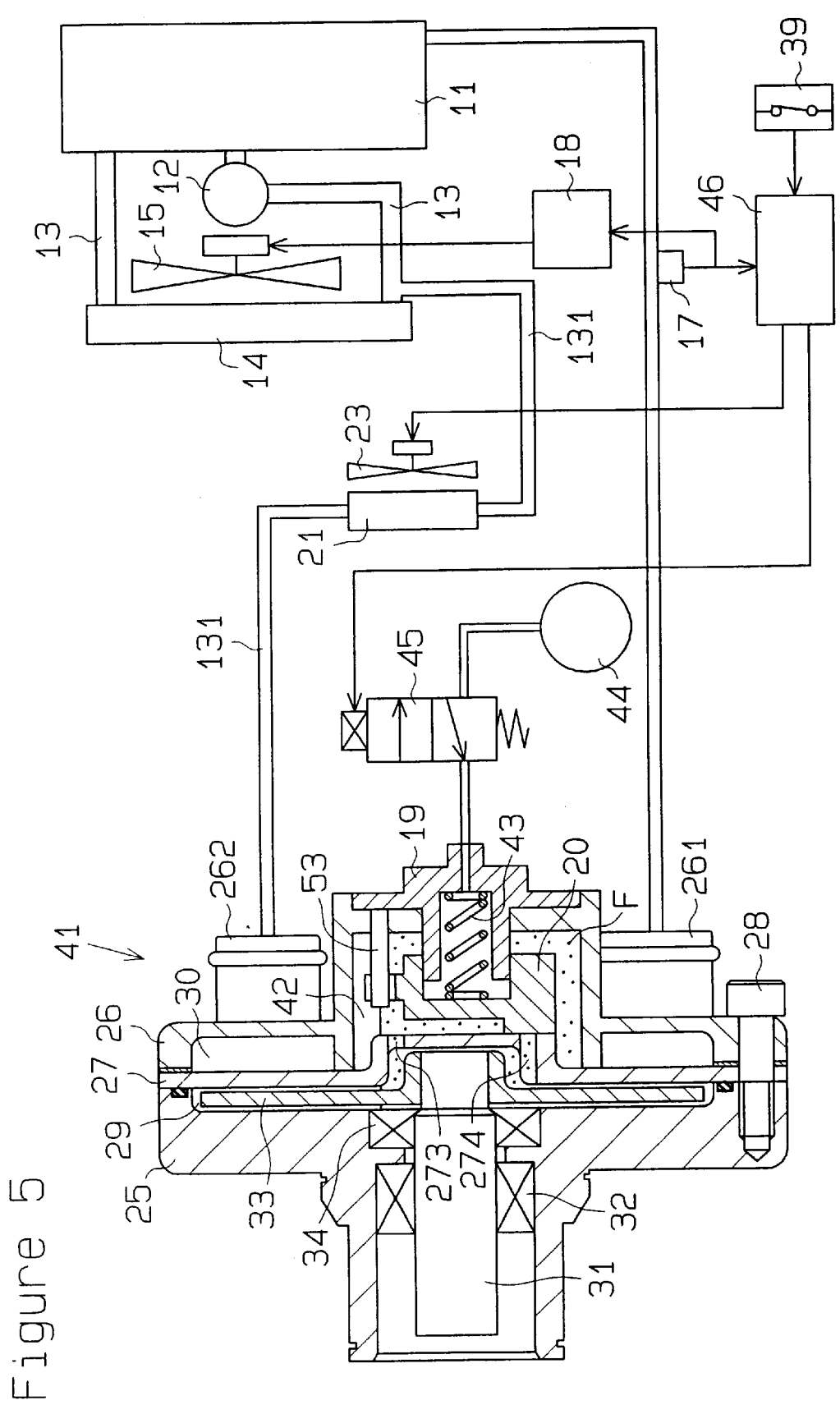
FIG. 5 is a diagram of a heating system containing a heat generator according to a third embodiment of the present invention, showing a state where the heat generator is operated with the minimum heat generating capacity.
Figure 6:
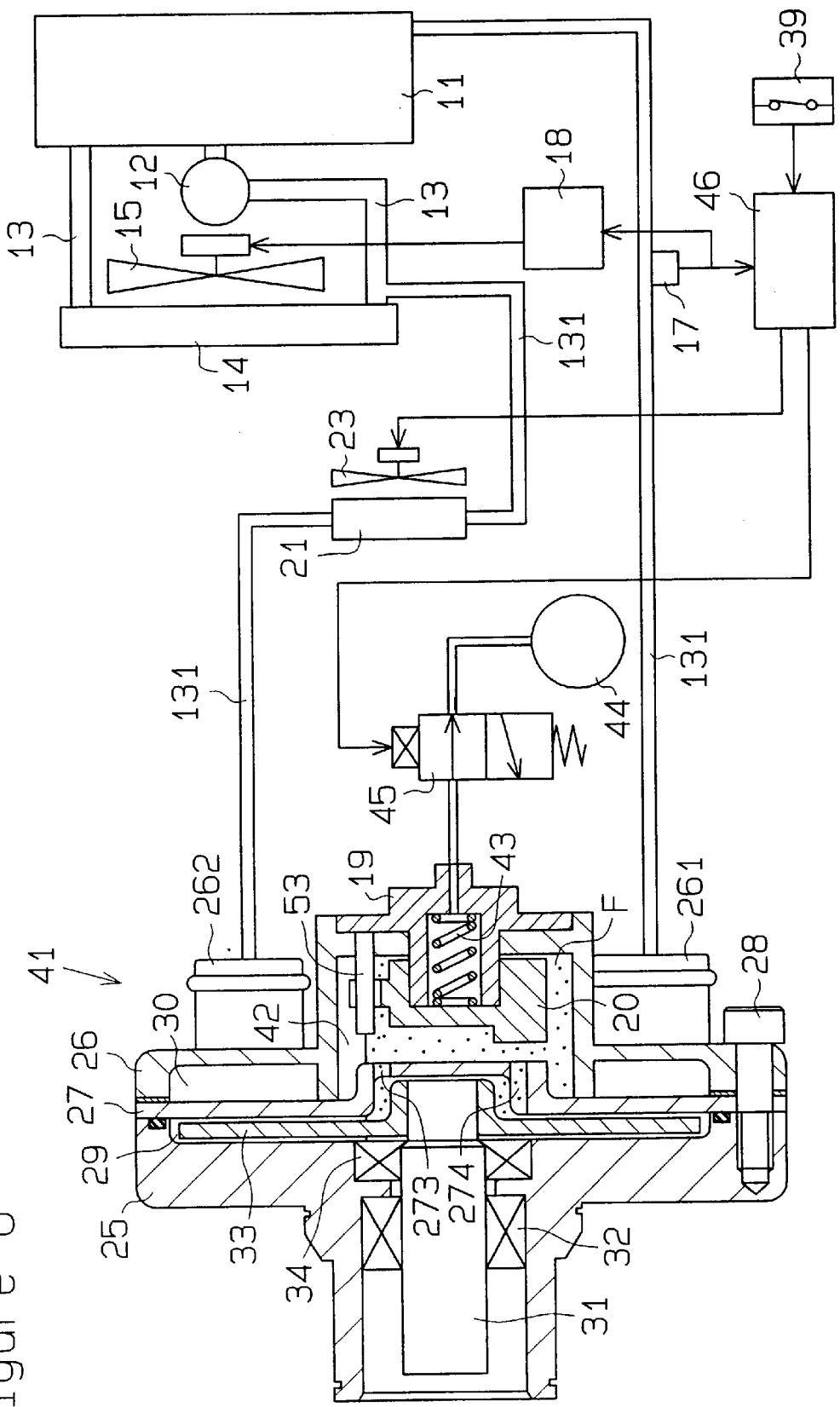
FIG. 6 is a diagram of the heating system illustrated in FIG. 5, showing a state where the heat generator is operated with the maximum heat generating capacity.

In FIGS. 5 and 6, an auxiliary heater switch 39 is turned ON. When the water temperature detected by a water temperature sensor 17 reaches a preset first temperature T1, an auxiliary heating control section 46 demagnetizes the solenoid valve 45 to allow the inner space of the cylinder 19 to communicate with the atmosphere via the solenoid valve 45, as shown in FIG. 5. Accordingly, the internal pressure of the cylinder 19 becomes equal to the atmospheric pressure, so that the spool 20 is pressed against the partition 27 under the action of the atmospheric pressure and the spring force of the compression spring 43. The spool 20 thus pressed against the partition 27 closes the supply passage 274. The viscous fluid F in the heating chamber 29 is discharged through the recovery passage 273 into the reservoir 42, at least due to the Weissenberg effect, and thus the volume of the viscous fluid F in the heating chamber 29 decreases. Accordingly, the heating value in the vehicular heat generator 41 is reduced.

When the water temperature detected by the water temperature sensor 17 reaches a preset second temperature T2 (T2<T1), the auxiliary heating control section 46 magnetizes the solenoid valve 45 to allow the inner space of the cylinder 19 to communicate with the suction pump 44 via the solenoid valve 45. Thus, the internal pressure of the cylinder 19 becomes lower than the atmospheric pressure, and the spool 20 is spaced away from the partition 27, as shown in FIG. 6. The spool thus spaced away from the partition 27 opens the supply passage 274. While the viscous fluid F in the heating chamber 29 is discharged through the recovery passage 273 to the reservoir 42, the viscous fluid F in the reservoir 42 is fed through the supply passage 274 to the heating chamber 29 in an amount greater than that discharged through the recovery passage 273 into the reservoir 42. Accordingly, the volume of the viscous fluid F in the heating chamber 29 is increased to increase the heating value in the heat generator 41.

The spool 20, the compression spring 43, the solenoid valve 45 and the suction pump 44 constitute not only means for opening and closing the supply passage 274 but also variable volume means for adjusting the volume of the viscous fluid in the heating chamber 29. In other words, the vehicular heat generator 41 is a variable heating capacity type heating apparatus.

Advantages of the third embodiment will be described in the following paragraphs.

(3-1) The third embodiment enjoys the same advantages as described in the paragraphs (1-1), (1-2) and (1-3) of the first embodiment.

(3-2) The supply passage 274 is closed when the heat generator 41 is operated with reduced heating capacity, and the viscous fluid F in the heating chamber 29 is partly recovered through the recovery passage 273 into the reservoir 42, at least by the Weissenberg effect. The structure of circulating the viscous fluid F under the Weissenberg effect is very simple.

In the third embodiment, the results are satisfactory even with a viscous fluid having a nominal viscosity of 10,000 cSt to 30,000 cSt. Accordingly, the nominal viscosity of the viscous fluid that may be employed in the vehicular heat generator 41 according to the third embodiment is within the range of 10,000 cSt to 100,000 cSt. The viscous fluid F employed in the third embodiment is a silicone oil showing pseudoplastic fluid-like non-Newtonian viscosity, like in the first embodiment.

(Fourth embodiment)

A fourth embodiment of the vehicular heating system incorporated with a heat generator 47 will be described referring to FIGS. 7 and 8. Constituents that are the same as those in the third embodiment are affixed with the same reference numbers, respectively.

A partition 27 in the heat generator 47 according to the fourth embodiment has a cylindrical portion 275 in which a spool 48 is slidably contained. The spool 48 is urged by a compression spring 50 away from a circlip 51. A solenoid 49 is incorporated into the cylindrical portion 275. The solenoid 49 is subject to magnetization and demagnetization control by an auxiliary heating control section 46. When the solenoid 49 is magnetized, the spool 48 abuts against the circlip 51 against the spring force of the compression spring 50. When the solenoid 49 is demagnetized, the spool 48 is spaced away from the circlip 51 by the spring force of the compression spring 50. Accordingly, the capacity of a reservoir 52 defined between a rotary shaft 31 and the spool 48 is changed by switching the solenoid 49 between magnetization and demagnetization.

The volume of the viscous fluid F present in the heating chamber 29 and the reservoir 52 is designed to be smaller than the minimum capacity of the heating chamber 29 and the reservoir 52. A fluid having a nominal viscosity of 30,000 cSt to 100,000 cSt is employed as the viscous fluid F.

Figure 7:
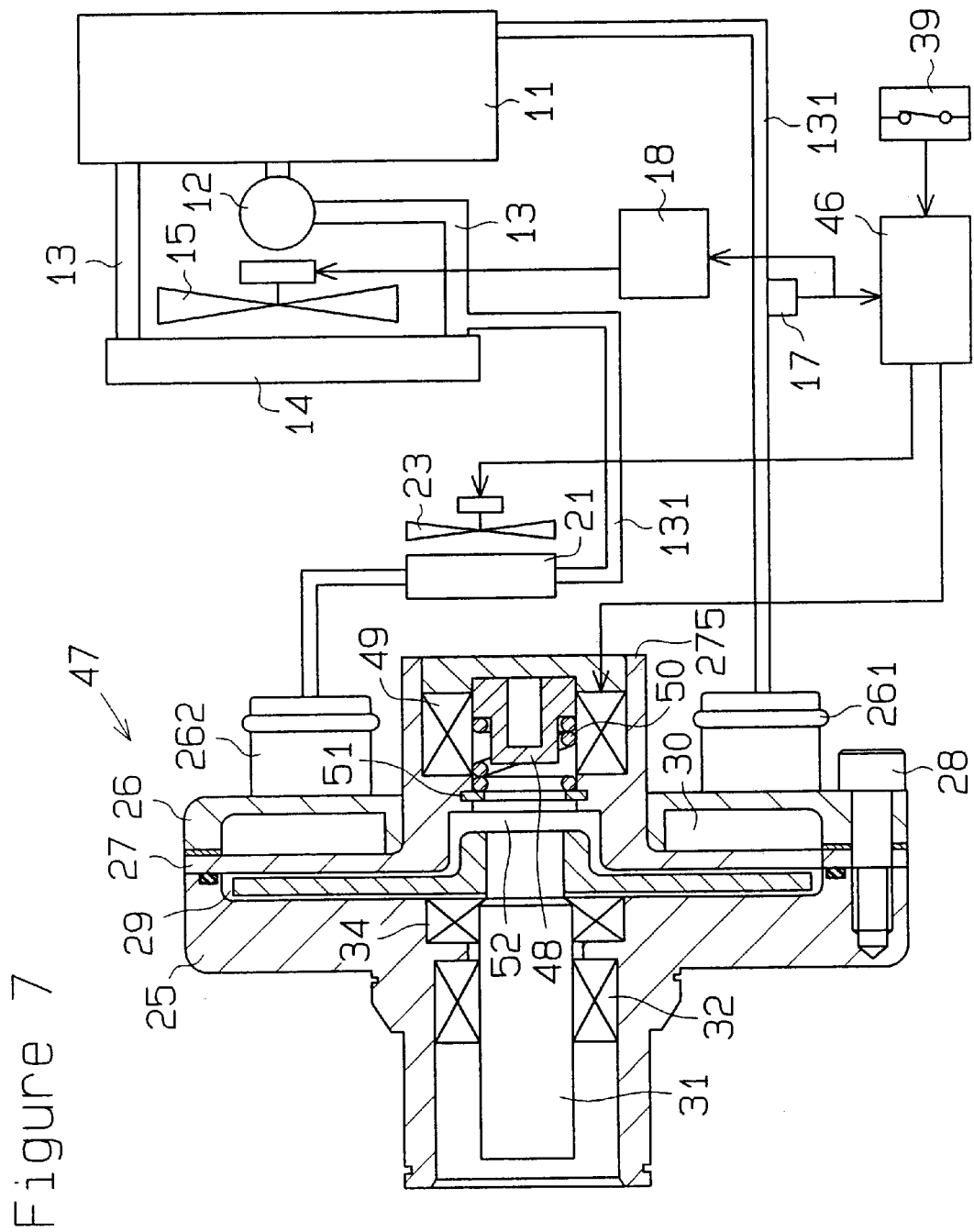
FIG. 7 is a heating system containing a heat generator according to a fourth embodiment of the present invention, showing a state where the heat generator is operated with the minimum heat generating capacity.
Figure 8:
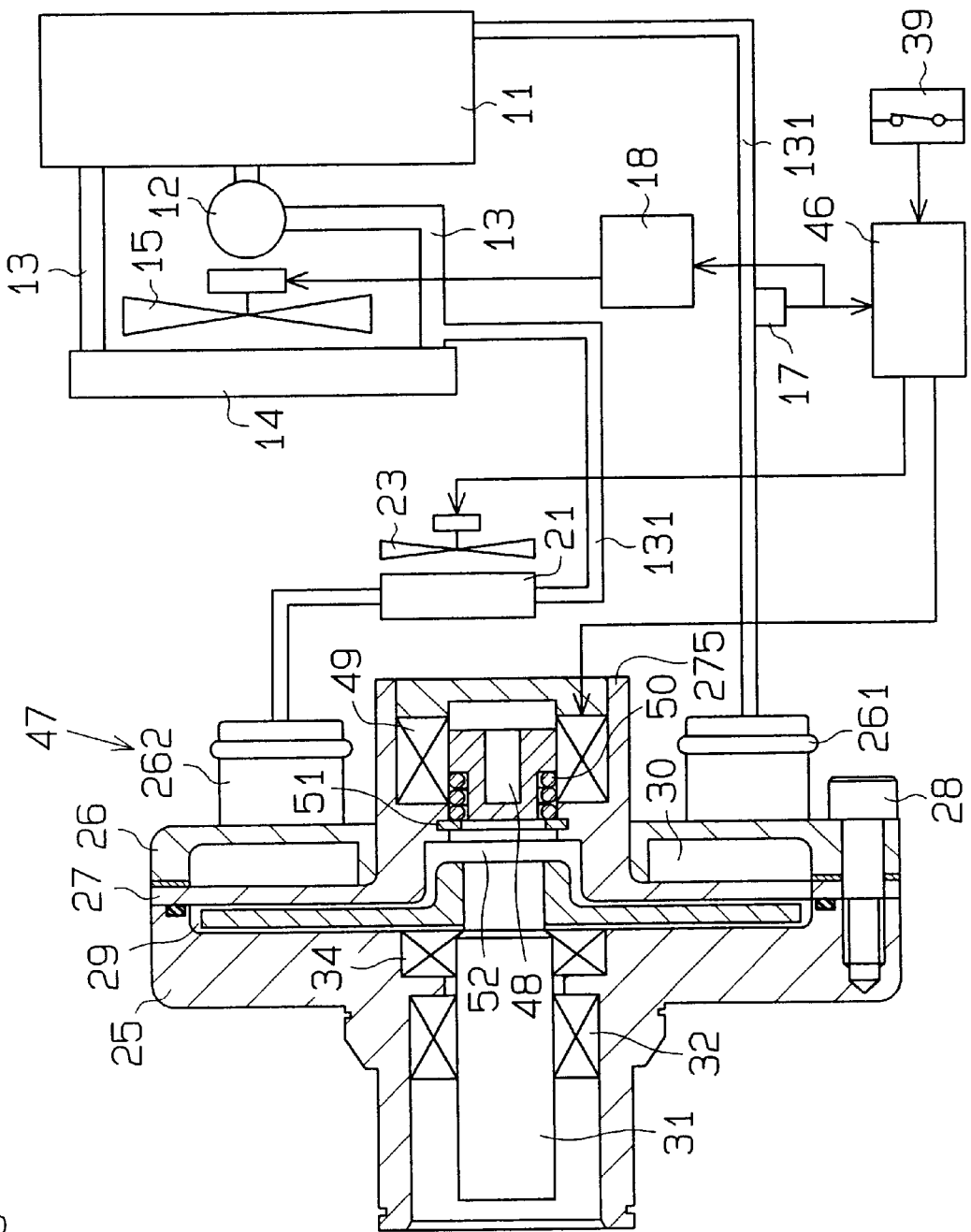
FIG. 8 is a diagram of the heating system illustrated in FIG. 7, showing a state where the heat generator is operated with the maximum heat generating capacity.

In FIGS. 7 and 8, an auxiliary heater switch 39 is turned ON. In the state where the heater switch 39 is turned on, the auxiliary heating control section 46 controls magnetization and demagnetization of the solenoid 49, like that of the solenoid valve 45 in the third embodiment. When the solenoid 49 is demagnetized, the spool 48 is spaced away from the circlip 51, as shown in FIG. 7, to maximize the capacity of the reservoir 52. Accordingly, the volume of the viscous fluid in the heating chamber 29 is minimized resulting in the minimum heating capacity in the vehicular heat generator 47. When the solenoid 49 is magnetized, the spool 48 abuts against the circlip 51, as shown in FIG. 8. Thus, the capacity of the reservoir 52 is minimized to maximize the volume of the viscous fluid in the heating chamber 29. Accordingly, the heating capacity in the vehicular heat generator 47 is maximized. The spool 48, the solenoid 49 and the compression spring 50 form variable volume means for adjusting the volume of the viscous fluid in the heating chamber 29.

Advantages of the fourth embodiment will be described in the following paragraphs.

(4-1) The fourth embodiment enjoys the same advantages as in the paragraphs (1-1), (1-2) and (1-3) of the first embodiment.

(4-2) The structure for recovering the viscous fluid F from the heating chamber 29 through the communication passage to the reservoir 52, at least by the Weissenberg effect, when the heat generator 47 is operated with reduced heating capacity constitutes the simplest structure for adjusting the heating capacity.

In the fourth embodiment, satisfactory results are obtained even if a viscous fluid having a nominal viscosity of 10,000 cSt to 30,000 cSt is employed. Further there are no practical problems even if a viscous fluid having a nominal viscosity of 100,000 cSt to 200,000 cSt is employed. Accordingly, the nominal viscosity of the viscous fluid to be employed in the vehicular heat generator 47 according to the fourth embodiment is in the range of 10,000 cSt to 200,000 cSt. The viscous fluid F employed in the fourth embodiment is a silicone oil showing pseudoplastic fluid-like non-Newtonian viscosity, like in the first embodiment.

(Fifth embodiment)

A vehicular heat generator 22A according to the fifth embodiment, which is an improvement of the heat generator 22 of the first embodiment, will be described referring to FIGS. 12 and 13. The heat generator 22A of the fifth embodiment is different from the heat generator 22 of the first embodiment in the shape of the rotor 33.

Figure 12:
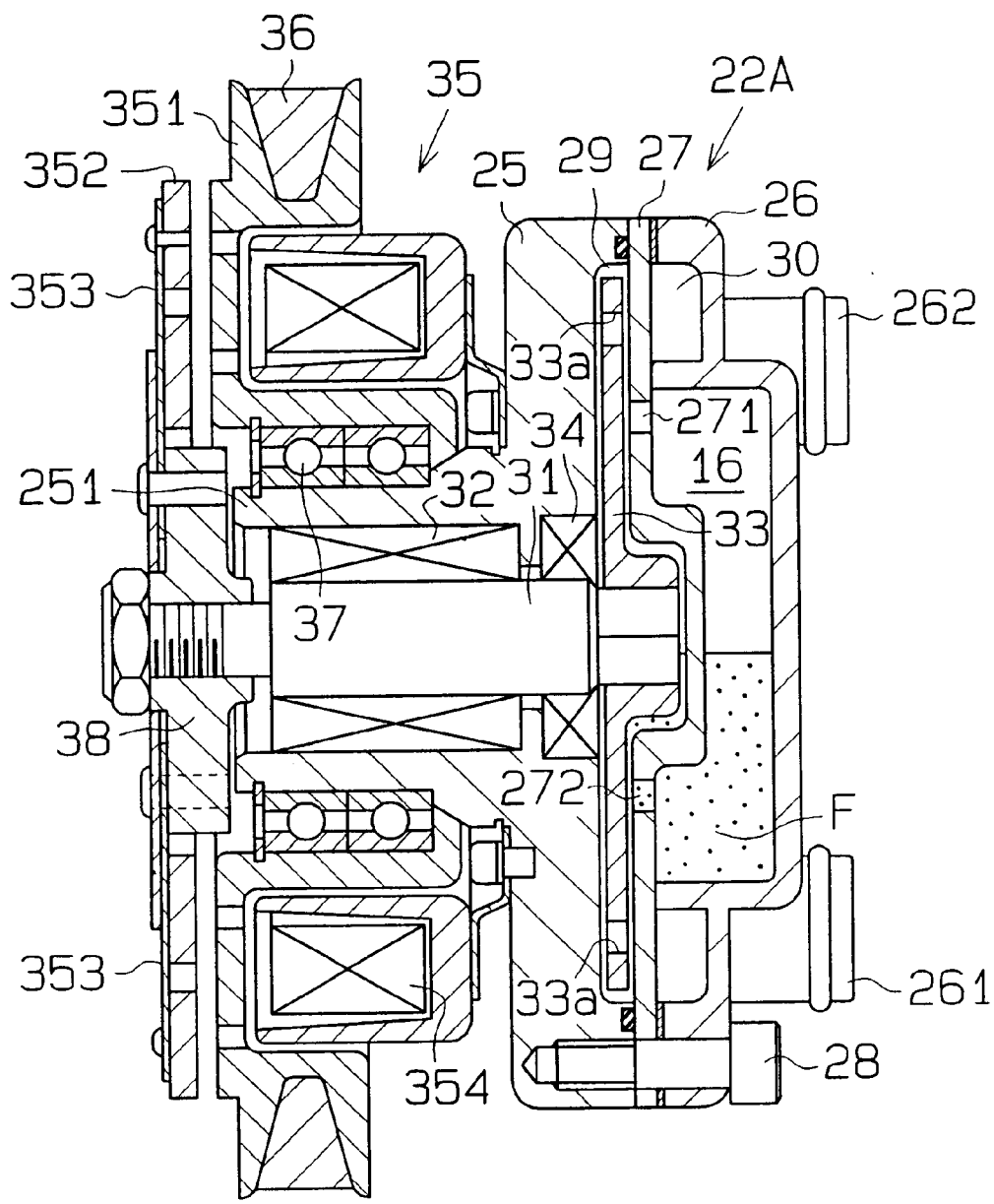
FIG. 12 is a cross-sectional view of a heat generator according to a fifth embodiment of the present invention.
Figure 13:
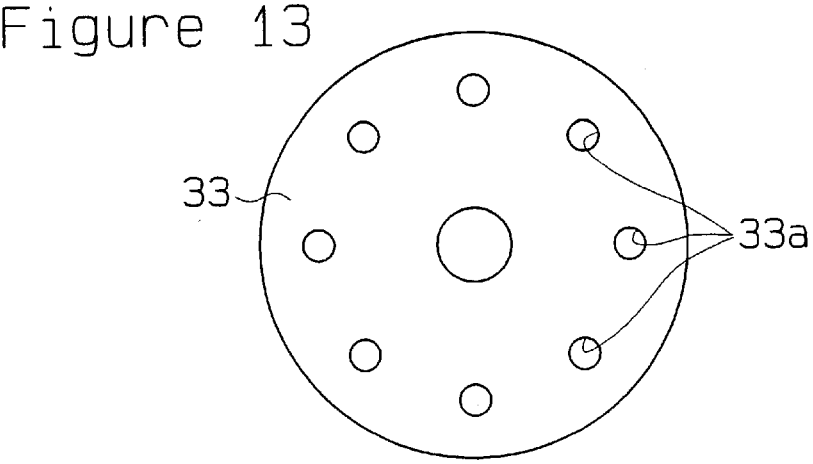
FIG. 13 is a front view of a rotor in the heat generator shown in FIG. 12.

As shown in FIGS. 12 and 13, the disc-shaped rotor 33 has a plurality of openings 33a at its periphery. These openings 33a are arranged at equal distances from the center of the rotor 33 and at equiangular intervals. The openings 33a penetrating the rotor body permit easy flow of the viscous fluid between the front space and rear space of the rotor 33 in the heating chamber 29. Thus, there is no difference between the fluid pressure on the front side of the rotor 33 and the fluid pressure on the rear side of the rotor 33, so that rotation of the rotor 33 is stabilized. In addition, formation of the openings 33a inevitably forms circular edges on each surface of the rotor 33. These edges serve to enhance the capacity of the rotor 33 to shear the viscous fluid and greatly improve heating efficiency. Accordingly, the plurality of openings 33a formed in the rotor 33 serve as means for increasing shearing efficiency.

Figure 14:
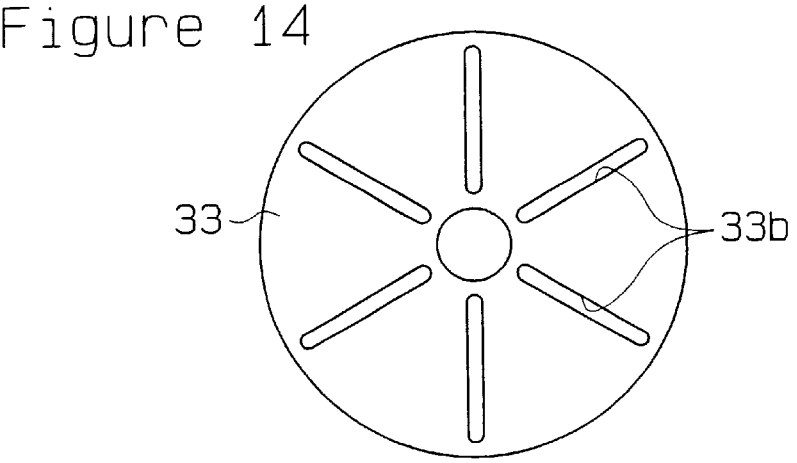
FIG. 14 is a front view of another example of rotor.
Figure 15:
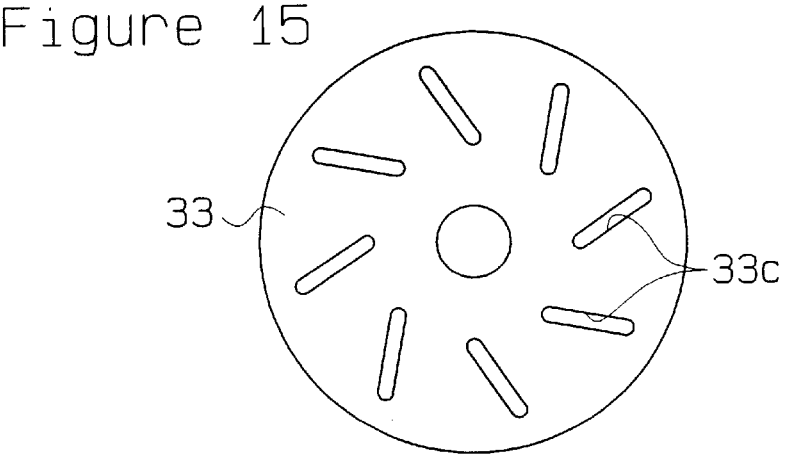
FIG. 15 is a front view of another example of rotor.

The means for increasing shearing efficiency formed in the rotor 33 is not limited to such openings 33a penetrating the rotor 33 but may be a plurality of recesses formed on the rotor surfaces, for example, a plurality of radial grooves 33b as shown in FIG. 14 or a plurality of spirally arranged grooves 33c as shown in FIG. 15.

Figure 16:
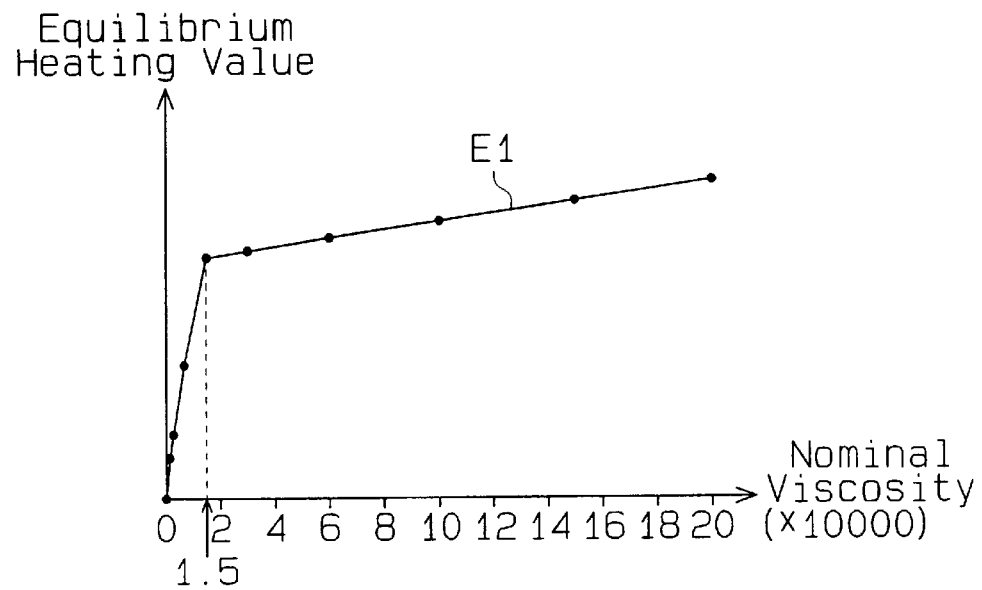
FIG. 16 is a graph showing relationship between the nominal viscosity and the heating value in the heat generator according to the fifth embodiment.

As a viscous fluid F employed in a vehicular heat generator provided with a rotor having such shearing action improving means, one having a nominal viscosity of 10,000 cSt to 100,000 cSt, or more preferably, 15,000 cSt to 100,000 cSt is employed. FIG. 16 shows relationship between the nominal viscosity and the heating value in the heat generator according to the fifth embodiment. As shown in FIG. 16, in the viscous fluids having nominal viscosity values of 15,000 cSt or more, the increase in the equilibrium heating value attained as the nominal viscosity increases tends to reach a ceiling.

Next, various test results, which are helpful for understanding advantages of the present invention, will be described.

Figure 17:
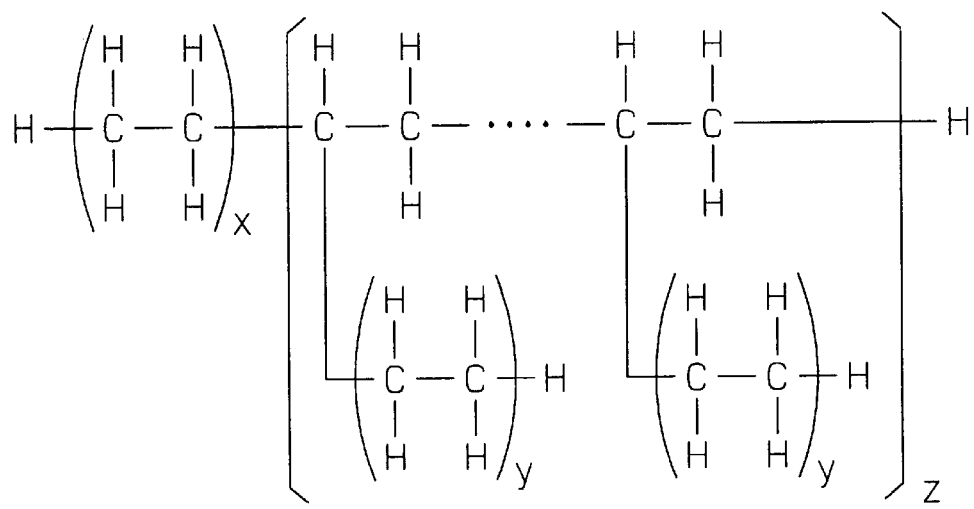
FIG. 17 is a chemical structural formula of a hydrocarbon series polymer employable as the Newtonian fluid.

(Test 1): Evaluation of the low-temperature starting property of a vehicular heat generator A heat generator 22 (provided with a solenoid clutch 35) of the first embodiment was tested to determine whether it starts smoothly or not comparing a case where a pseudoplastic fluid-like non-Newtonian fluid is employed as the viscous fluid F to a case where a Newtonian fluid is employed. As the pseudoplastic fluid-like non-Newtonian fluid, a dimethyl-polysiloxane type silicone oil (trade name: KF96H, manufactured by Shin-Etsu Chemical Co., Ltd.) having a nominal viscosity of 30,000 cSt was employed. Meanwhile, as the Newtonian fluid, a hydrocarbon type polymer (trade name: POLYALPHAOLEON PAO 2000, manufactured by Idemitsu Kosan Co., Ltd.) having a nominal viscosity of 2,000 cSt was employed. The chemical structural formula of PAO 2000 is shown in FIG. 17.

In this test, a vehicular diesel engine was employed as an external drive source, the heat generator was placed in an environment of −30° C., the revolution speed of the diesel engine was maintained at 1,000 rpm, and starting conditions of the rotary shaft 31 and the rotor 33 were observed by shifting the solenoid clutch 35 to the ON position. Further, starting torque was measured.

The measured value of starting torque when the silicone oil showing non-Newtonian viscosity was employed was about 30 Nm, which is almost the same as the theoretical calculated value. Meanwhile, in the case of the hydrocarbon type polymer showing Newtonian viscosity, slippage occurred between the pulley 351 and the clutch plate 352 when the solenoid clutch 35 was turned ON, so that the rotor 33 could not be started. Incidentally, the theoretical value of starting torque required in the case of the Newtonian fluid, which is obtained by calculation, is a very high value of about 180 Nm. The fact that slippage occurred between the pulley 351 and the clutch plate 352 supports the calculative estimate that the required starting torque is excessive.

While it is an experiential fact that the greatest torque is required when a stationary rotor 33 in a cold viscous fluid F is started, the test results clearly show that the use of a pseudoplastic fluid-like non-Newtonian fluid as a viscous fluid F can relatively reduce the starting torque of the rotor. Particularly, considering also the great necessity of the vehicular heat generator as an auxiliary heat source in cold regions, it is a great advantage that the vehicular heat generator can be started smoothly even in an extremely low-temperature environment, which reduces the load applied to the vehicle engine.

(Test 2): Evaluation of high-temperature resistance of silicone oils

Two kinds of tests for evaluating the high-temperature resistance of silicone oils were carried out employing silicone oils showing pseudoplastic fluid-like non-Newtonian viscosity.

Figure 18:
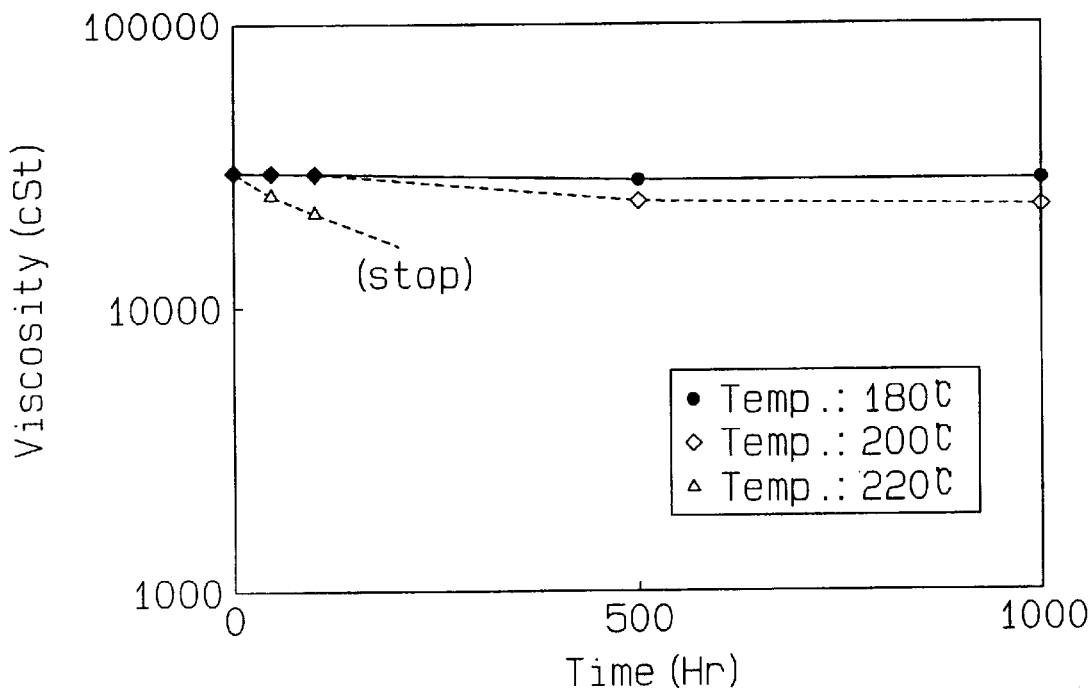
FIG. 18 is a graph showing evaluation results of heat resistance of a viscous fluid at high temperatures.

In a first high-temperature resistance test, a dimethyl-polysiloxane type silicone oil having a nominal viscosity of 30,000 cSt was introduced into an aluminum cylindrical container in an amount corresponding to about 60% of the capacity of the container, and the container was hermetically sealed with a lid. The thus sealed container was left to stand in an oven preset to a predetermined temperature (e.g., 180° C., 200° C. and 220° C.) for a long period. The graph in FIG. 18 shows the relationship between the time elapsed and the viscosity of the silicone oil in the container in the first high-temperature resistance test. According to the graph of FIG. 18, when the preset temperature of the oven was 220° C., the viscosity of the silicone oil dropped sharply with time, so that the test could have been terminated after passage of about 100 hours. Meanwhile, in the case where the oven preset temperature was 180° C., no drop in the viscosity was observed, and the viscosity of the silicone oil after passage of 1,000 hours was substantially the same as that of the initial viscosity. Similarly, the dimethyl-polysiloxane type silicone oil having a nominal viscosity of 30,000 cSt resisted viscosity loss after 1,000 hours or more at 180° C.

Figure 19:
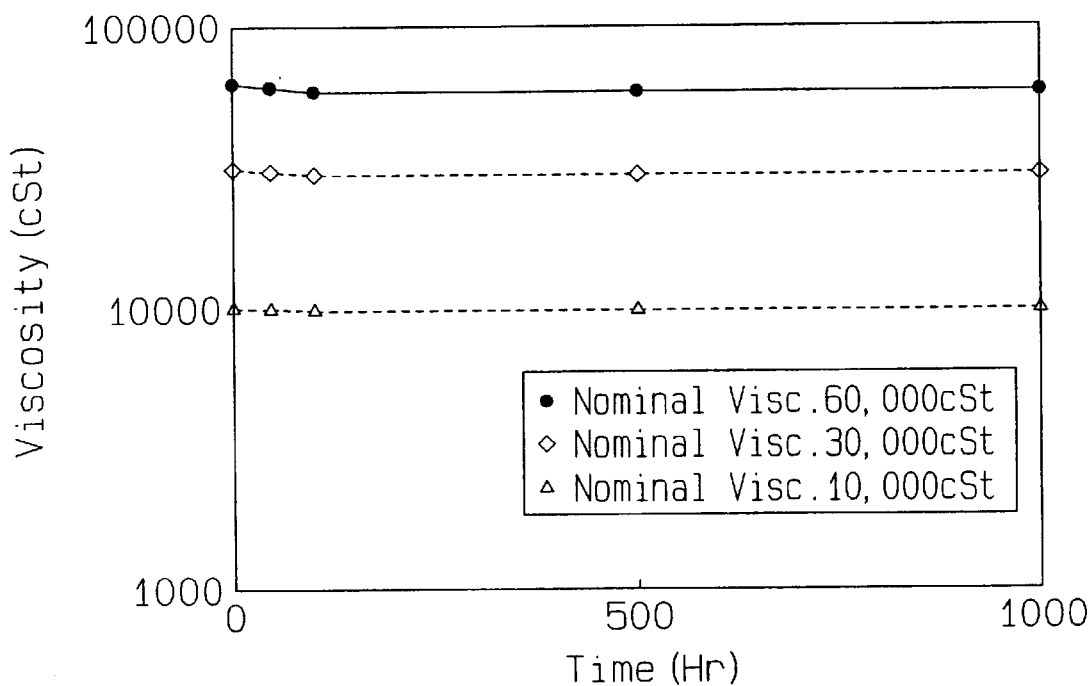
FIG. 19 is a graph showing evaluation results of heat resistance of viscous fluids at a high temperature.

In a second high-temperature resistance test, dimethyl-polysiloxane type silicone oils having nominal viscosity values of 10,000 cSt, 30,000 cSt and 60,000 cSt were introduced into aluminum cylindrical containers in amounts corresponding to about 60% of the capacity of each container, and the containers were hermetically sealed with lids, respectively. These containers were left to stand in an oven preset to 180° C. for a long time. The graph in FIG. 19 shows relationship between the time elapsed and the viscosity of each silicone oil in the container in the second high-temperature resistance test. According to the graph of FIG. 19, in any of the silicone oils having nominal viscosity values of 10,000 cSt, 30,000 cSt and 60,000 cSt respectively, no drop in the viscosity was observed, and the viscosity of each silicone oil after passage of 1,000 hours was substantially the same as that of the initial viscosity. As described above, each dimethyl-polysiloxane type silicone oil having a nominal viscosity of 10,000 cSt to 60,000 cSt resisted viscosity loss after 1,000 hours or more at 180° C.

(Test 3): Fluctuation in heating value under continuous operation of a vehicular heat generator Maintenance of the heating capacity of the vehicular heat generator 22 according to the first embodiment when it was operated continuously was determined employing a dimethyl-polysiloxane type silicone oil having a nominal viscosity of 30,000 cSt (trade name: KF96H, manufactured by Shin-Etsu Chemical Co., Ltd.). More specifically, the rotation speed of the rotor was set such that the viscous fluid was heated to a desired temperature at the start of rotor rotation, and the vehicular heat generator was operated continuously under feedback control of the rotation of the rotor such that the predetermined rotation speed was maintained.

Figure 20:
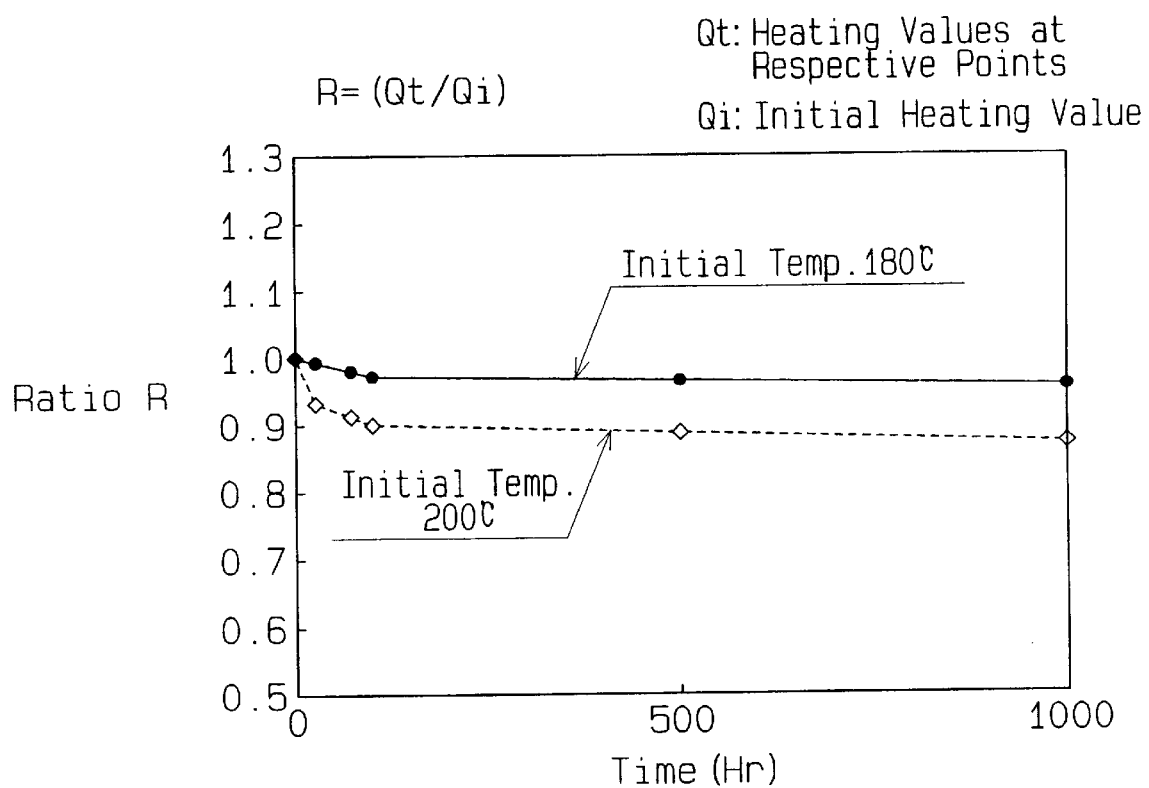
FIG. 20 is a graph showing results of a continuous running test of a heat generator.

The graph in FIG. 20 shows results of fluctuation in the heating value when the heat generator was operated continuously. The abscissa in the graph represents the time T elapsed after the heat generator was started. The ordinate in the graph represents the ratio R of the heating value at each time point Qt to the initial heating value Qi immediately after the heat generator was started (R=Qt/Qi). When the ratio R is 1.0, the heating value at each time point Qt is equal to the initial heating value Qi, and when the ratio R is smaller than 1.0, the heating value at each time point Qt is smaller than the initial heating value Qi. In the graph of FIG. 20, results when the rotation speed of the rotor was preset such that the initial temperature of the viscous fluid immediately after the start of rotor rotation was 180° C. and results when the rotor revolution speed was preset such that the initial temperature of the viscous fluid was 200° C. are plotted.

According to the graph shown in FIG. 20, as long as the rotor was driven at a rotation speed such that the initial temperature was 180° C., the ratio R did not drop below 0.95 even after passage of 1,000 hours. In other words, as long as the rotor is driven at a rotation speed such that the initial temperature is 180° C., the drop in the heating value of the heat generator can be controlled to about 5% of the initial heating value Qi. These results suggest that if the initial heating temperature is about 180° C., there occurs substantially no drop in the viscosity of the silicone oil attributed to thermal deterioration.

We claim:

1. A viscous fluid for use in a vehicular heat generator, wherein the heat generator has a rotor that generates heat by mechanically shearing the fluid, and wherein the viscous fluid is a non-Newtonian fluid having apparent viscosity characteristics with respect to shear rate such that its apparent viscosity tends to decrease as the shear rate increases.

2. The viscous fluid for use in a vehicular heat generator according to claim 1, wherein the viscous fluid has a nominal viscosity within the range of 10,000 centistokes to 200,000 centistokes.

3. The viscous fluid for use in a vehicular heat generator according to claim 1, wherein a major component of the viscous fluid is silicone oil.

4. The viscous fluid for use in a vehicular heat generator according to claim 3, wherein the silicone oil in the viscous fluid contains dimethyl-polysiloxane.

5. A vehicular heat generator comprising:
   a housing;
   a heating chamber within the housing;
   a viscous fluid within the heating chamber having apparent viscosity characteristics with respect to shear rate such that its apparent viscosity tends to decrease as the shear rate increases and having a nominal viscosity in the range of 10,000 centistokes to 200,000 centistokes;
   a radiating chamber through which a circulating fluid flows;
   a rotary shaft rotatably supported in the housing; and
   a rotor located in the heating chamber, wherein the rotor is rotated by the rotary shaft, and wherein heat is generated by shearing of the viscous fluid by rotation of the rotor, and wherein heat is transferred from the heating chamber to the circulating fluid.

6. The vehicular heat generator according to claim 5, wherein the viscous fluid is a silicone oil having non-Newtonian viscosity such that the apparent viscosity of the viscous fluid tends to decrease as the shear rate increases.

7. The vehicular heat generator according to claim 5, wherein the viscous fluid has a nominal viscosity in the range of 30,000 centistokes to 100,000 centistokes.

8. The vehicular heat generator according to claim 5, wherein the rotor is provided with means for increasing shearing efficiency, and the nominal viscosity of the viscous fluid is in the range of 15,000 centistokes to 100,000 centistokes.

9. The vehicular heat generator according to claim 5, further comprising a drive train located between an external drive source and the rotary shaft of the rotor, wherein the drive train includes a clutch.

10. A vehicular heat generator comprising:
    a housing;
    a viscous fluid contained in the housing, wherein the viscous fluid has apparent viscosity characteristics with respect to shear rate such that its apparent viscosity tends to decrease as the shear rate increases, and wherein the viscous fluid further has a nominal viscosity in the range of 10,000 centistokes to 100,000 centistokes;
    a heating chamber located within the housing, wherein a portion of the viscous fluid is stored in the heating chamber;
    a reservoir located within the housing, wherein the reservoir communicates with the heating chamber, and wherein a portion of the viscous fluid is stored in the reservoir;

a radiating chamber located within the housing through which a circulating fluid flows;

a rotary shaft rotatably supported in the housing; and a rotor located in the heating chamber, wherein the rotor is rotated by the rotary shaft, and wherein heat is generated by shearing of the viscous fluid by rotation of the rotor, and wherein heat is transferred from the heating chamber to the circulating fluid.

11. The vehicular heat generator according to claim 10, wherein the viscous fluid is a silicone oil having non-Newtonian viscosity such that its apparent viscosity tends to decrease as the shear rate increases.

12. The vehicular heat generator according to claim 10, wherein the viscous fluid has a nominal viscosity in the range of 30,000 centistokes to 100,000 centistokes.

13. The vehicular heat generator according to claim 10, wherein the rotor includes means for increasing shearing efficiency, and the nominal viscosity of the viscous fluid is in the range of 15,000 centistokes to 100,000 centistokes.

14. The vehicular heat generator according to claim 10, wherein the reservoir and the heating chamber communicate with each other via a recovery passage and a supply passage, wherein the recovery passage opens to the reservoir at a location that is above the level of the viscousfluid contained in the reservoir, and wherein the supply passage opens to the reservoir at a location that is below the level of the viscous fluid in the reservoir.

15. The vehicular heat generator according to claim 10, further comprising a drive train located between an external drive source and the rotary shaft of the rotor, wherein the drive train includes a clutch.

16. The vehicular heat generator according to claim 10, further comprising a a communicating passage that permits communication between the heating chamber and the reservoir near an axially central zone of the rotor, wherein the heat generator recovers viscous fluid from the heating chamber through the communicating passage to the reservoir, at least by the Weissenberg effect, for reducing the level of heat generation by the heat generator.

17. The vehicular heat generator according to claim 10, further comprising a recovery passage and a supply passage, which permit communication between the reservoir and the heating chamber, wherein the heat generator recovers viscous fluid from the heating chamber through the recovery passage to the reservoir, at least by the Weissenberg effect, for reducing the level of heat generation by the heat generator.

18. A method for generating heat in a vehicle which comprises providing a rotor which is capable of being driven at a plurality of rotational speeds and driving the rotor to produce mechanical shearing of a viscous fluid in contact with the rotor to generate heat, the viscous fluid being a non-Newtonian fluid having apparent viscosity characteristics with respect to shear rates in the fluid such that the apparent viscosity decreases as the shear rate increases.

19. A method according to claim 18 wherein the viscous fluid has a nominal viscosity withing the range of 10,000 centistokes to 200,000 centistokes.

20. A method according to claim 18 wherein a major component of the viscous fluid is silicone oil.

21. A method according to claim 20 wherein the silicone oil in the viscous fluid contains dimethylsiloxane.

22. A vehicular heat generator comprising:

a housing;

a heating chamber within the housing;

a viscous fluid within the heating chamber, the viscous fluid being a non-Newtonian fluid that has apparent viscosity characteristics with respect to shear rate such that its apparent viscosity tends to decrease as the shear rate increases;

a radiating chamber through which a circulating fluid flows;

a rotary shaft supported in the housing; and a rotor located in the heating chamber, wherein the rotor is rotated by the rotary shaft, and wherein heat is generated by shearing of the viscous fluid by rotation of the rotor, and wherein heat is transferred from the heating chamber to the circulating fluid.

23. The vehicular heat generator according to claim 22, wherein a major component of the viscous fluid is silicone oil that contains dimethyl-polysiloxane.

* * * * *

UNITED STATES PATENT AND TRADEMARK OFFICE
CERTIFICATE OF CORRECTION

PATENT NO. : 6,116,514
DATED : September 12, 2000
INVENTOR(S) : Moroi et al.

It is certified that error appears in the above-identified patent and that said Letters Patent is hereby corrected as shown below:

Column 6,
Line 23, "T($4\pi\omega r^4/h)x\mu$" should read -- T$\propto(4\pi\omega r^4/h)x\mu$ --
Line 27, "Q T$x\omega$" should read -- Q $\propto$T$x\omega$ --

Column 21,
Line 24, please change "viscousfluid" to -- viscous fluid --
Line 33, please delete "a"

Column 22,
Line 15, please change "withing" to -- within --

Signed and Sealed this

Fifth Day of March, 2002

Attest:

JAMES E. ROGAN
*Attesting Officer*    *Director of the United States Patent and Trademark Office*